US012347931B2

(12) United States Patent
Park et al.

(10) Patent No.: US 12,347,931 B2
(45) Date of Patent: Jul. 1, 2025

(54) ELECTRONIC DEVICE INCLUDING ANTENNAS

(71) Applicant: Samsung Electronics Co., Ltd., Suwon-si (KR)

(72) Inventors: Seongjin Park, Suwon-si (KR); Yongsang Yun, Suwon-si (KR); Gunbae Lim, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 18/177,394

(22) Filed: Mar. 2, 2023

(65) Prior Publication Data

US 2023/0208047 A1 Jun. 29, 2023

Related U.S. Application Data

(63) Continuation of application No. PCT/KR2022/012948, filed on Aug. 30, 2022.

(30) Foreign Application Priority Data

Oct. 12, 2021 (KR) .................. 10-2021-0135076

(51) Int. Cl.
*H01Q 21/06* (2006.01)
*H01Q 3/26* (2006.01)
*H01Q 21/24* (2006.01)

(52) U.S. Cl.
CPC ......... *H01Q 21/065* (2013.01); *H01Q 3/2682* (2013.01); *H01Q 21/24* (2013.01)

(58) Field of Classification Search
CPC .... H01Q 21/065; H01Q 3/2682; H01Q 21/24; H01Q 1/2283; H01Q 1/243;
(Continued)

(56) References Cited

U.S. PATENT DOCUMENTS

| | | |
|---|---|---|
| 9,252,488 B2 | 2/2016 | Orihara et al. |
| 9,582,031 B2 | 2/2017 | Nam et al. |
| 10,418,687 B2 | 9/2019 | Mow et al. |
| 11,024,938 B2 | 6/2021 | Moon et al. |
| 11,336,002 B2 | 5/2022 | Park et al. |
| 11,515,616 B2 | 11/2022 | Ramasamy et al. |

(Continued)

FOREIGN PATENT DOCUMENTS

| | | | |
|---|---|---|---|
| CN | 112310653 A | * 2/2021 | .......... H01Q 1/2258 |
| CN | 112310653 B | 4/2023 | |

(Continued)

OTHER PUBLICATIONS

Jia, Translation of CN-112310653-A, Feb. 2, 2021 (Year: 2021).*

(Continued)

*Primary Examiner* — Daniel D Chang
(74) *Attorney, Agent, or Firm* — Jefferson IP Law, LLP

(57) ABSTRACT

An electronic device is provided. The electronic device includes a first housing, a second housing including a first surface, a second surface, and a third surface, an antenna module including a printed circuit board (PCB) and conductive patches disposed on one surface of the PCB facing the third surface of the second housing, a conductive plate disposed between the antenna module and the third surface of the second housing, and a wireless communication circuit electrically connected to the antenna module, wherein the conductive patches may be positioned at a first height from the second surface of the second housing, wherein the conductive plate may be parallel to the second surface of the second housing and positioned at a second height lower than the first height of the conductive patches, and wherein the wireless communication circuit may be configured to supply power to the conductive patches to transmit and/or receive a signal in a frequency band of 20 gigahertz (GHz) or more.

19 Claims, 21 Drawing Sheets

<Cross-sectional view of A-A'>

(58) Field of Classification Search
CPC .... H01Q 9/0407; H01Q 19/104; H01Q 21/08; H01Q 1/2266; H01Q 1/38; H04M 1/02; H04M 1/026
See application file for complete search history.

(56) References Cited

U.S. PATENT DOCUMENTS

| | | | |
|---|---|---|---|
| 2019/0058240 A1 | 2/2019 | Tang et al. | |
| 2021/0273314 A1* | 9/2021 | Nguyen | H01Q 1/2266 |
| 2021/0280961 A1* | 9/2021 | Kim | H01Q 1/243 |
| 2022/0311128 A1* | 9/2022 | Seo | H01Q 5/307 |

FOREIGN PATENT DOCUMENTS

| | | |
|---|---|---|
| JP | 2011-055279 A | 3/2011 |
| JP | 5950549 B2 | 7/2016 |
| KR | 10-2011-0127558 A | 11/2011 |
| KR | 101113346 B1 | 2/2012 |
| KR | 10-2020-0022161 A | 3/2020 |
| KR | 10-2020-0101256 A | 8/2020 |
| KR | 10-2020-0131775 A | 11/2020 |
| KR | 10-2021-0056000 A | 5/2021 |
| KR | 10-2021-0079998 A | 6/2021 |
| KR | 10-2021-0111050 A | 9/2021 |
| KR | 10-2537495 B1 | 5/2023 |

OTHER PUBLICATIONS

International Search Report dated Dec. 19, 2022, issued in an International Application No. PCT/KR2022/012948.
Extended Search Report dated Dec. 6, 2024, issued in European Application No. 22881201.2-1201.

* cited by examiner

ELECTRONIC DEVICE INCLUDING ANTENNAS

CROSS-REFERENCE TO RELATED APPLICATION(S)

This application is a continuation application, claiming priority under § 365(c), of an International application No. PCT/KR2022/012948, filed on Aug. 30, 2022, which is based on and claims the benefit of a Korean patent application number 10-2021-0135076, filed on Oct. 12, 2021, in the Korean Intellectual Property Office, the disclosure of which is incorporated by reference herein in its entirety.

BACKGROUND

Field

The disclosure relates to an electronic device including an antenna.

Description of Related Art

In line with the development of communication devices, electronic devices (e.g., notebook computers) may include an antenna module capable of fast and high-capacity transmission for production and transmission of a variety of content, Internet connection with various things (e.g., Internet of things (IoT)), or communication connection between various types of sensors for autonomous driving. For example, the electronic device may include an antenna module that radiates an mmWave signal (hereinafter referred to as a millimeter wave (mmWave) antenna module).

The mmWave antenna module may be disposed adjacent to a housing that forms the appearance of the electronic device. For example, the electronic device may include two mmWave antenna modules that are disposed adjacent to side surfaces of the electronic device and form beams toward the side surfaces.

The above information is presented as background information only to assist with an understanding of the disclosure. No determination has been made, and no assertion is made, as to whether any of the above might be applicable as prior art with regard to the disclosure.

SUMMARY

In the case where a first antenna module supporting an mmWave band is disposed to face one side surface of an electronic device, the first antenna module may have limited antenna coverage in consideration of the directivity of a signal in the mmWave band. In addition, in the case where the electronic device in which the first antenna module is disposed corresponds to, for example, a notebook computer, the electronic device may be used by a user in the state of being disposed on a support structure (e.g., a desk). The support structure (e.g., a desk) may interfere with a signal transmitted and/or received by the first antenna module, which may make it difficult to secure antenna coverage.

Aspects of the disclosure are to address at least the above-mentioned problems and/or disadvantages and to provide at least the advantages described below. Accordingly, an aspect of the disclosure is to provide a conductive plate between an antenna module and a housing of the electronic device to reflect a signal having polarized wave characteristics in a first direction, which is transmitted and/or received by the antenna module.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing including a first surface facing the first housing when the first housing and the second housing are in a folded state, a second surface opposite the first surface, and a third surface between the first surface and the second surface, and rotatably connected to the first housing, an antenna module including a printed circuit board (PCB) and conductive patches disposed on one surface of the PCB facing the third surface of the second housing and disposed adjacent to the third surface of the second housing, a conductive plate disposed between the antenna module and the third surface of the second housing, and a wireless communication circuit electrically connected to the antenna module, wherein the conductive patches may be positioned at a first height from the second surface of the second housing, wherein the conductive plate may be parallel to the second surface of the second housing and positioned at a second height lower than the first height of the conductive patches, and wherein the wireless communication circuit may be configured to supply power to the conductive patches to transmit and/or receive a signal in a frequency band of 20 gigahertz (GHz) or more.

In accordance with another aspect of the disclosure, an electronic device is provided. The electronic device includes a first housing, a second housing including a first surface facing the first housing when the first housing and the second housing are in a folded state, a second surface opposite the first surface, and a third surface between the first surface and the second surface, and rotatably connected to the first housing, an antenna module disposed adjacent to the third surface of the second housing and including a printed circuit board (PCB) and conductive patches disposed on one surface of the PCB facing in a second direction forming a specific angle with a first direction perpendicular to the third surface of the second housing, a conductive plate at least a portion of which is disposed between the antenna module and the third surface of the second housing, and a wireless communication circuit electrically connected to the antenna module, wherein the first surface and the third surface may form a first corner, wherein the conductive patches may be positioned at a first height from the second surface of the second housing, wherein at least a portion of the conductive plate may be parallel to the second surface of the second housing and positioned at a second height lower than the first height of the conductive patches, and wherein the wireless communication circuit may be configured to supply power to the conductive patches to transmit and/or receive a signal in a frequency band of 20 GHz or more.

In accordance with another aspect of the disclosure, a mobile communication device is provided. The mobile communication device includes a display disposed on a front surface of the mobile communication device, a frame structure configured to form a first side surface of the mobile communication device, a rear cover configured to form at least a portion of a rear surface of the mobile communication device, an antenna module disposed adjacent to the first side surface of the mobile communication device and including a printed circuit board (PCB) and conductive patches disposed on one surface of the PCB facing the first side surface, a conductive plate disposed between the antenna module and the first side surface of the mobile communication device, and a wireless communication circuit electrically connected to the antenna module, wherein the conductive patches may be positioned at a first height from the rear cover, wherein the conductive plate may be parallel to the rear cover and positioned at a second height higher than the first height of the conductive patches, and wherein the wireless communication circuit may be configured to supply power to the conductive patches to transmit and/or receive a signal in a frequency band of 20 GHz or more.

According to various embodiments disclosed in this document, the electronic device is able to secure a wide antenna coverage, based on a signal reflected by the conductive plate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
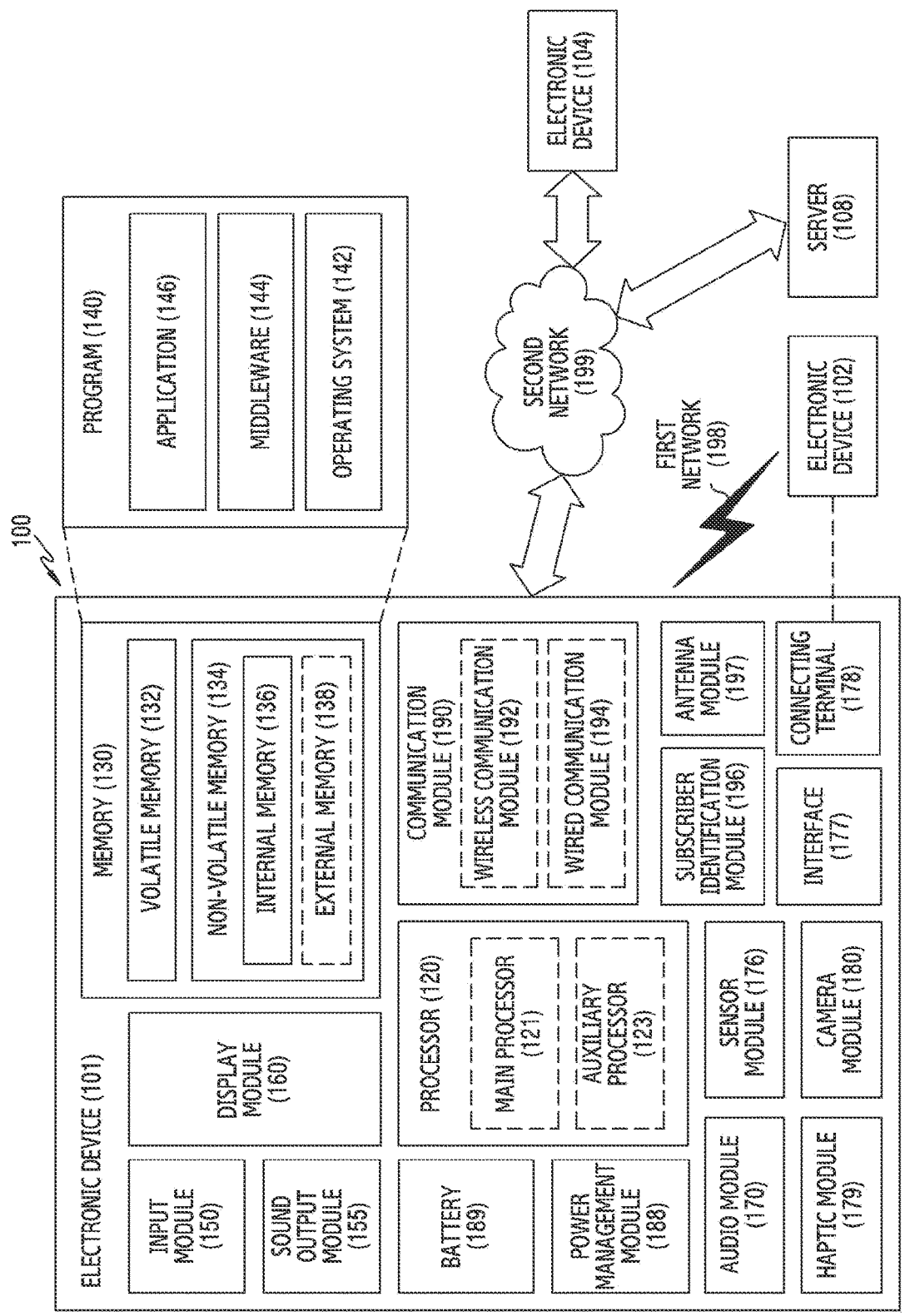
FIG. 1 is a diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
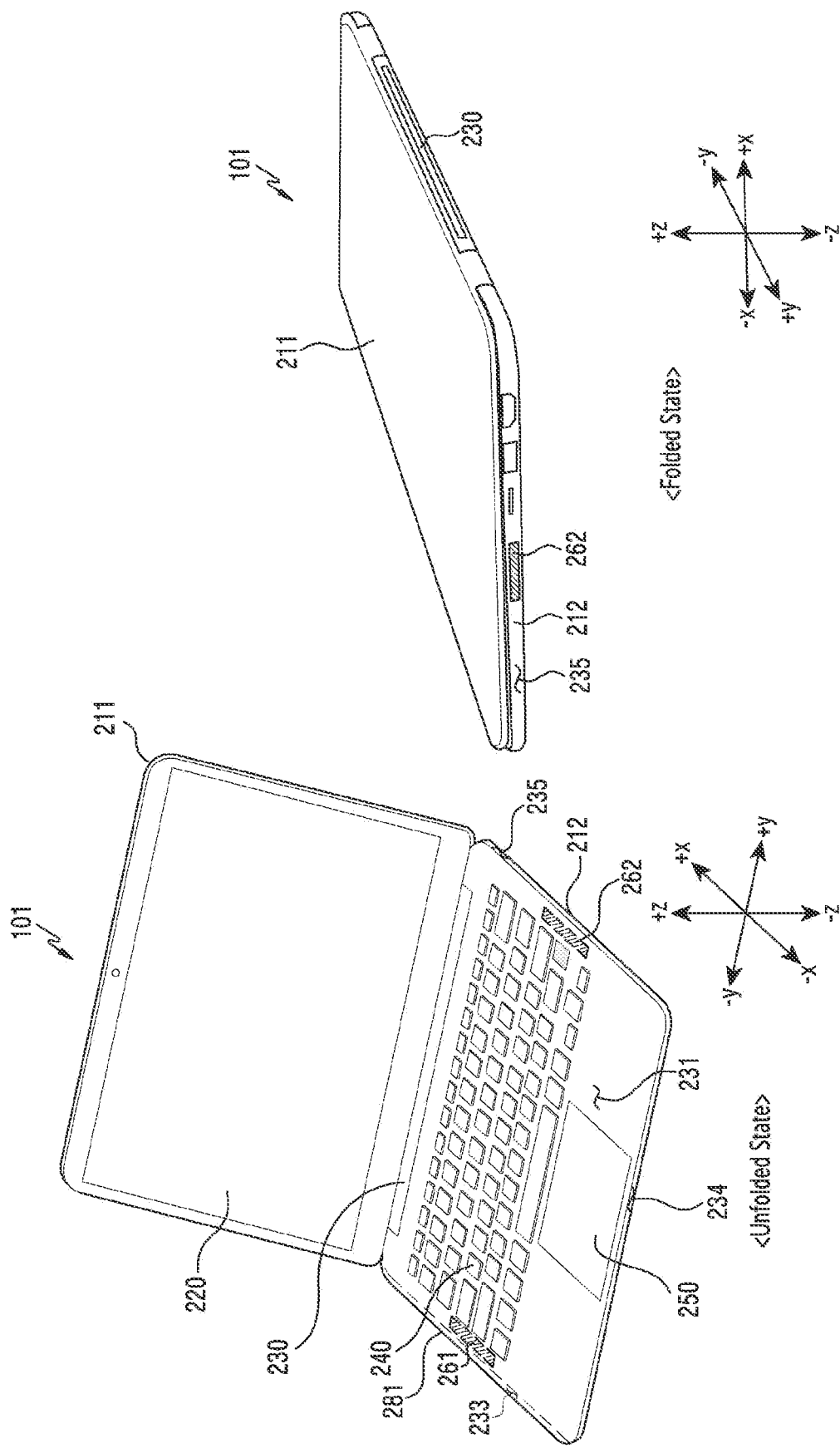
FIG. 2A is a diagram illustrating an electronic device in an unfolded state and a folded state according to an embodiment of the disclosure.

FIG. 2A is a diagram illustrating an electronic device in an unfolded state and a folded state according to an embodiment of the disclosure.

Figure 2B:
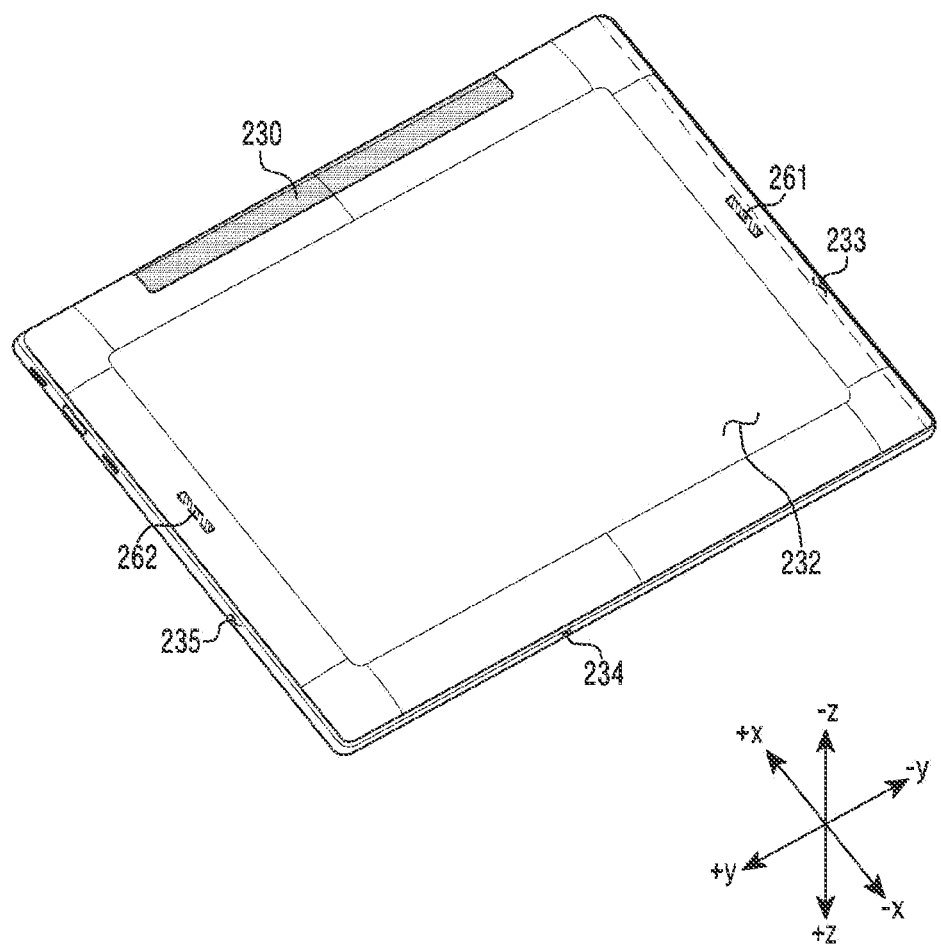
FIG. 2B is a diagram illustrating a rear side of an electronic device in a folded state according to an embodiment of the disclosure.

FIG. 2B is a diagram illustrating a rear side of an electronic device in a folded state according to an embodiment of the disclosure.

Referring to FIGS. 2A and 2B, an electronic device 101 according to an embodiment may include a first housing 211, a second housing 212, a display 220, a hinge structure 230, a keyboard 240, and/or keypad 250.

According to an embodiment, the first housing 211 and/or the second housing 212 may constitute at least a part of the exterior of the electronic device 101. In an embodiment, at least a portion of the first housing 211 and/or the second housing 212 may be formed of coated or tinted glass, ceramic, polymer, metal (e.g., aluminum, stainless steel (STS), or magnesium), of a combination of at least two of the above materials.

According to an embodiment, the second housing 212 may be rotatably connected to the first housing 211. For example, the first housing 211 and the second housing 212 may be connected by a hinge structure 230. For example, the second housing 212 may rotate about a first axis (e.g., the y-axis) relative to the first housing 211. In an embodiment, the first housing 211 and the second housing 212 may be disposed on both sides of the first axis (e.g., the y-axis) and have an overall symmetrical shape with respect to the first axis. However, not limited to a symmetrical shape, the first housing 211 and the second housing 212 may have an asymmetric shape with respect to the first axis.

According to an embodiment, the display 220 may be positioned in the first housing 211. For example, the display 220 may be disposed in the first housing 211 to form a portion of an inner space of the electronic device 101. In an embodiment, a plurality of electronic components (e.g., a printed circuit board) may be disposed in the inner space of the electronic device 101. In an embodiment, the display 220 may be coupled to or disposed adjacent to a touch detection circuit, a pressure sensor capable of measuring the intensity (pressure) of a touch, and/or a digitizer detecting a magnetic-field type stylus pen.

According to an embodiment, the second housing 212 may include a first surface 231, a second surface 232, a third surface 233, a fourth surface 234 and/or a fifth surface 235. In an embodiment, the first surface 231 may indicate a surface facing the first housing 211 in the state in which the first housing 211 and the second housing 212 are folded (e.g., in a folded state). In an embodiment, the second surface 232 may indicate the opposite surface of the first surface 231. For example, the second surface 232 may be a surface facing in a direction (e.g., the −z direction) opposite a first direction (e.g., the +z direction) in which the first surface 231 faces. As another example, the second surface 232 may indicate a surface parallel to the first surface 231. In an embodiment, the third surface 233, the fourth surface 234, and the fifth surface 235 may correspond to surfaces surrounding a space between the first surface 231 and the second surface 232. For example, the third surface 233 may indicate a surface substantially perpendicular to the first surface 231 and the second surface 232. In an embodiment, the first surface 231 and the third surface 233 may form a first corner 281.

According to an embodiment, the keyboard 240 may be disposed on the first surface 231 of the second housing 212. In an embodiment, the keypad 250 may be disposed on the first surface 231 of the second housing 212. For example, the keypad 250 may be positioned in a second direction (e.g., the −x direction) with respect to the keyboard 240. In an embodiment, the keypad 250 may identify a user's touch input using a touch sensor coupled to the keypad 250. For example, when a part (e.g., a finger) of the user's body comes into contact with at least a portion of the keypad 250, the sensor of the keypad 250 may detect a change in the capacitance of the portion in contact with the body part, thereby identifying the user's touch input.

According to an embodiment, the electronic device 101 may include a first antenna module 261 and/or a second antenna module 262, and the first antenna module 261 and the second antenna module 262 may be disposed adjacent to one surface of the second housing 212. For example, the first antenna module 261 may be disposed adjacent to the third surface 233 of the second housing 212. As another example, the second antenna module 262 may be disposed adjacent to the fifth surface 235 of the second housing 212. In an embodiment, the first antenna module 261 may be disposed to form a beam in a third direction (e.g., the −y direction), and the second antenna module 262 may be disposed to form a beam in a fourth direction (e.g., the +y direction). In an embodiment, the first antenna module 261 and the second antenna module 262 may transmit and/or receive a signal of a specific frequency band (e.g., 7.125 GHz and 20 GHz) or more. For example, the specific frequency band may indicate a frequency band of mmWave.

Although it has been described that the electronic device 101 includes the first antenna module 261 and the second antenna module 262 in FIGS. 2A and 2B, this is only an example, and in another embodiment, the electronic device 101 may include various numbers of antenna modules. For example, the electronic device 101 may include a third antenna module in addition to the first antenna module 261 and the second antenna module 262.

Although it has been described that the first antenna module 261 and the second antenna module 262 are disposed adjacent to one surface of the second housing 212 in FIGS. 2A and 2B, this is only an example, and in another embodiment, the first antenna module 261 and/or the second antenna module 262 may be disposed at various positions of the electronic device 101. For example, the first antenna module 261 and/or the second antenna module 262 may be disposed in the first housing 211.

According to an embodiment, the electronic device 101 may be in an unfolded state, a folded state, and/or an intermediate state. In an embodiment, the state of the electronic device 101 may vary depending on the angle or distance between the first housing 211 and the second housing 212. For example, the state in which the first housing 211 and the second housing 212 are disposed at an angle of about 130 to 135 degrees therebetween may be an unfolded state. As another example, the state in which the first housing 211 and the second housing 212 are disposed to face each other may be a folded state. As another example, the state in which the first housing 211 and the second housing 212 are disposed at a certain angle (e.g., an angle between about 0 degrees and 130 degrees) therebetween may be an intermediate state. However, the specific angle formed by the first housing 211 and the second housing 212 in the folded state and unfolded state is provided for convenience of explanation, and is not limited thereto.

Figure 3A:
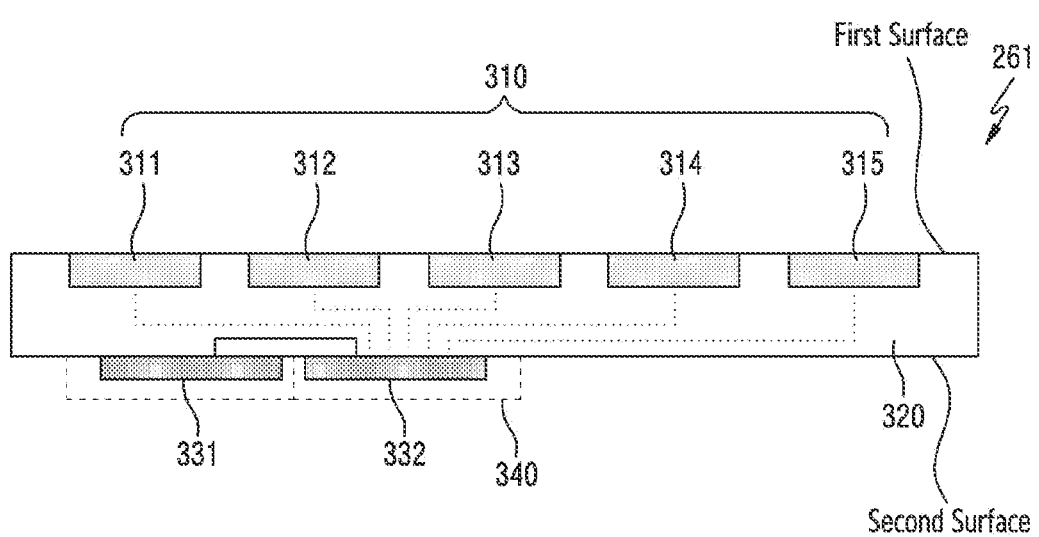
FIG. 3A is a cross-sectional view of a first antenna module according to an embodiment of the disclosure.

FIG. 3A is a diagram illustrating a cross-sectional view of a first antenna module according to an embodiment of the disclosure.

Referring to FIG. 3A, the first antenna module 261 according to an embodiment may include a first printed circuit board 320, conductive patches 310, a wireless communication circuit 332, and/or a power manage integrate circuit (PMIC) 331. In an embodiment, the first antenna module 261 may further include a shielding member 340 (e.g., a shield can).

In an embodiment, the first printed circuit board 320 may include a plurality of conductive layers and a plurality of non-conductive layers alternately stacked with the conductive layers. The first printed circuit board 320 may provide electrical connections between various electronic components disposed on the first printed circuit board 320 using wires and conductive vias formed in the conductive layers.

In an embodiment, the first antenna module 261 may include conductive patches 310. For example, the first antenna module 261 may include a first conductive patch 311, a second conductive patch 312, a third conductive patch 313, a fourth conductive patch 314, and/or a fifth conductive patch 315. In an embodiment, the conductive patches 310 may act as antenna elements for forming directional beams. In an embodiment, the conductive patches 310 may be formed on a first surface of the first printed circuit board 320 as shown in FIG. 3A. In another embodiment, the conductive patches 310 may be formed inside the first printed circuit board 320. According to an embodiment, the first antenna module 261 may further include a plurality of antenna arrays (e.g., a dipole antenna array and/or an additional patch antenna array) of the same or a different shape or type in addition to the conductive patches 310.

In an embodiment, the wireless communication circuit 332 may be disposed on a second surface opposite the first surface of the first printed circuit board 320. In an embodiment, the wireless communication circuit 332 may be configured to process an RF signal in a specific frequency band (e.g., a frequency band of 10 GHz or more) transmitted and/or received through the conductive patches 310. According to an embodiment, the wireless communication circuit 332 may convert a baseband signal obtained from the processor 120 to an RF signal in a specific frequency band in order to transmit a radio frequency (RF) signal in a specific frequency band. The wireless communication circuit 332 may convert an RF signal in a specific frequency band received through the conductive patches 310 into a baseband signal and provide the same to the processor 120.

According to an embodiment, an RF signal transmitted and/or received in a frequency band of about 10 GHz or more (or about 20 GHz or more) may have polarization characteristics. For example, a first RF signal in a frequency band of about 10 GHz or more may have a vertical polarization characteristic, and a second RF signal in a frequency band of about 10 GHz or more may have a horizontal polarization characteristic. Accordingly, the electronic device 101 may transmit a variety of information to an external device using the first RF signal and/or the second RF signal having different polarization characteristics.

According to another embodiment, the wireless communication circuit 332 may up-convert an IF signal (e.g., about 9 GHz to about 11 GHz) obtained from an intermediate frequency integrate circuit (IFIC) into an RF signal in a selected band in order to transmit an RF signal. In addition, the wireless communication circuit 332 may down-convert an RF signal obtained through the conductive patches 310 to convert the signal into an IF signal and transmit the same to the IFIC.

The PMIC 331 according to an embodiment may be disposed on the second surface of the first printed circuit board 320. The PMIC 331 may provide power required for various electronic components (e.g., the wireless communication circuit 332) of the first antenna module 261.

In an embodiment, the shielding member 340 may be disposed on the second surface of the first printed circuit board 320 to electromagnetically shield at least one of the wireless communication circuit 332 and the PMIC 331. For example, the shielding member 340 may be disposed on the second surface of the first printed circuit board 320 so as to cover the wireless communication circuit 332 and/or the PMIC 331. In an embodiment, the shielding member 340 may include, but is not limited to, an encapsulant such as an epoxy molding compound (EMC) or a shield can.

Although the first antenna module 261 is illustrated in FIG. 3A to include conductive patches 310 forming a 1×5 antenna array, it is not limited thereto and the first antenna module 261 may include conductive patches having a variety of numbers and arrangement structures. For example, the first antenna module 261 may include a first conductive patch 311 and a second conductive patch 312, and the first conductive patch 311 and the second conductive patch 312 may form a 1×2 antenna array. As another example, the first antenna module 261 may include a first conductive patch 311, a second conductive patch 312, a third conductive patch 313, and a fourth conductive patch 314, and the first conductive patch 311, the second conductive patch 312, the third conductive patch 313, and the fourth conductive patch 314 may form a 1×4 antenna array. Hereinafter, an antenna module including conductive patches forming a 1×4 antenna array according to another embodiment is illustrated in FIG. 3B.

Figure 3B:
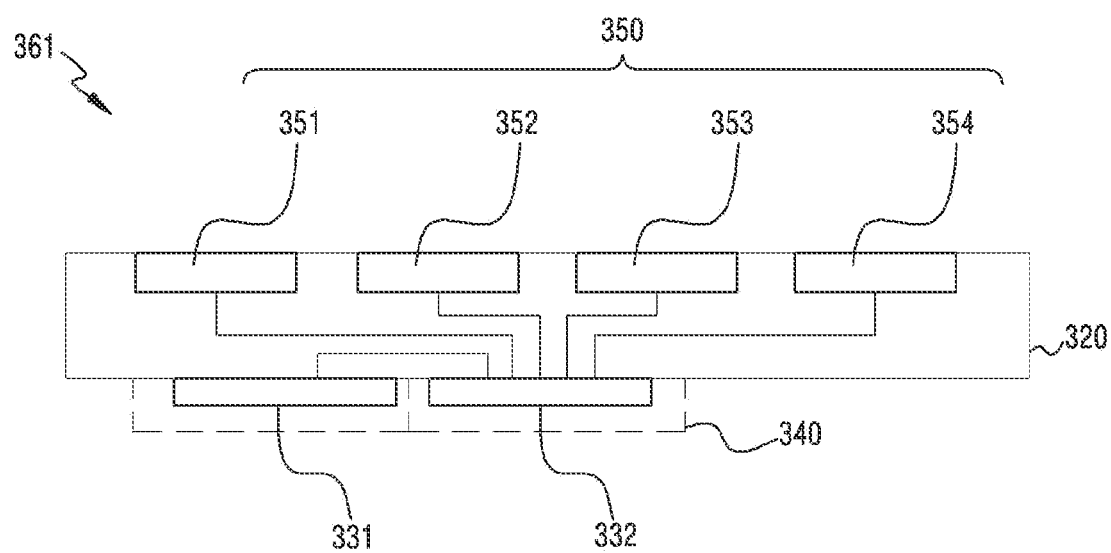
FIG. 3B is a diagram illustrating a first antenna module according to an embodiment of the disclosure.

FIG. 3B is a diagram illustrating a first antenna module according to an embodiment of the disclosure.

Referring to FIG. 3B, a first antenna module 361 according to an embodiment may include a plurality of conductive patches 350. For example, the first antenna module 361 may include a first conductive patch 351, a second conductive patch 352, a third conductive patch 353, and/or a fourth conductive patch 354. In an embodiment, the first conductive patch 351, the second conductive patch 352, the third conductive patch 353, and the fourth conductive patch 354 may form a 1×4 antenna array.

Figure 4:
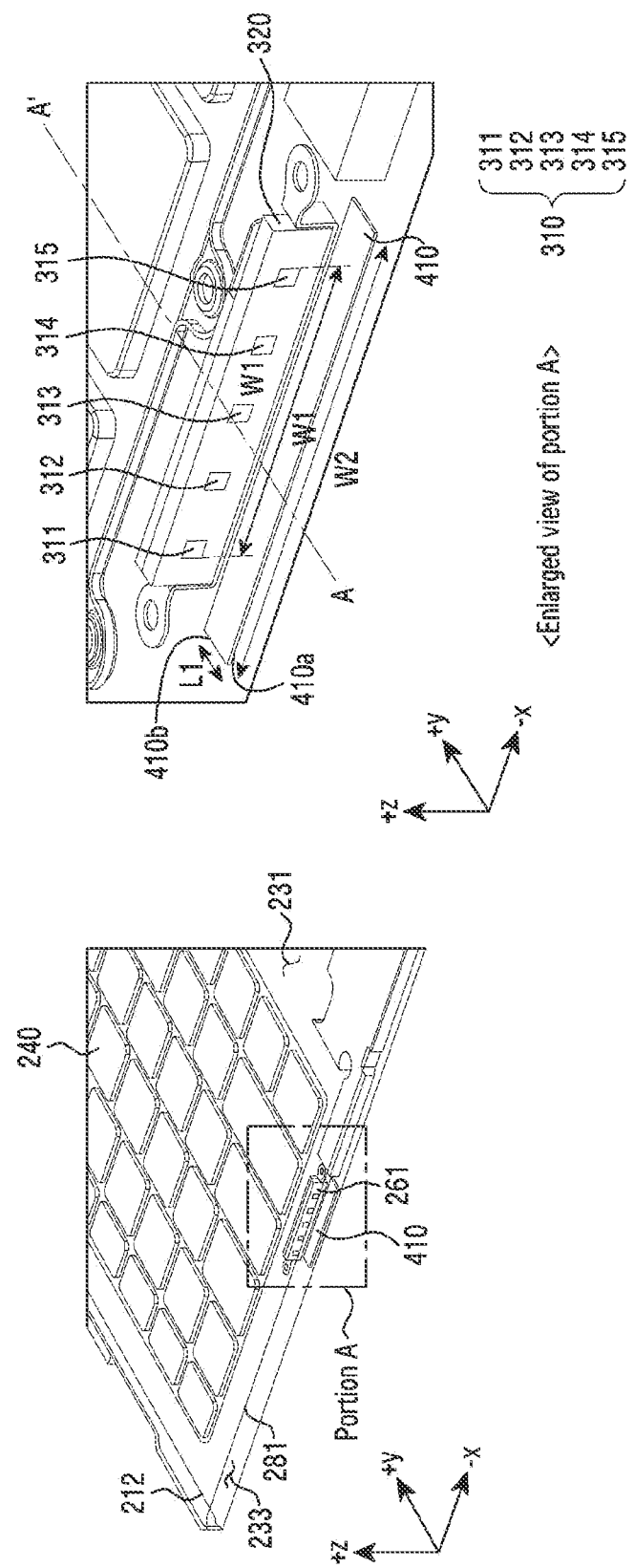
FIG. 4 is a diagram illustrating an arrangement structure of a first antenna module and a conductive plate according to an embodiment of the disclosure.

FIG. 4 is a diagram illustrating an arrangement structure of a first antenna module and a conductive plate according to an embodiment of the disclosure.

Referring to FIG. 4, the first antenna module 261 according to an embodiment may be disposed adjacent to the third surface 233 of the second housing 212, and the first antenna module 261 may be disposed to form a beam in the third direction (e.g., the −y direction). For example, the third direction may be understood as a direction toward the third surface 233 of the second housing 212. In an embodiment, the conductive patches 310 may face in the third direction (e.g., the −y direction), and the wireless communication circuit 332 may supply power to the conductive patches 310 to perform control to transmit and/or receive a radio frequency (RF) signal in a specific frequency band (e.g., 20 GHz or more) in the third direction (e.g., the −y direction). In an embodiment, signals of 20 GHz or more transmitted and/or received by the conductive patches 310 may have polarization characteristics. For example, a first signal among the signals of 20 GHz or more may have a polarization characteristic in a direction parallel to the z-axis. For example, the polarization characteristic in a direction parallel to the z-axis may correspond to a vertical polarization characteristic. As another example, a second signal among the signals of 20 GHz or more may have a polarization characteristic in a direction parallel to the x-axis. For example, the polarization characteristic in a direction parallel to the x-axis may correspond to a horizontal polarization characteristic.

Referring to the enlarged view of the portion A in which the first antenna module 261 is disposed in the second housing 212 according to an embodiment, the conductive patches 310 of the first antenna module 261 may have a first width W1 in the transverse direction (e.g., the x-axis direction). The fact that the conductive patches 310 have the first width W1 in the transverse direction (e.g., the x-axis direction) may include that the distance from the first conductive patch 311 to the fifth conductive patch 315 is substantially the first width W1. The transverse direction (e.g., the x-axis direction) may indicate a direction parallel to the first corner 281 formed by the first surface 231 and the third surface 233.

According to an embodiment, the electronic device 101 may include a conductive plate 410. In an embodiment, the conductive plate 410 may be disposed between the third surface 233 of the second housing 212 and the first antenna module 261. In an embodiment, the conductive plate 410 may be formed to be substantially parallel to the first surface 231 of the second housing 212. As another example, the conductive plate 410 may be formed to face in a first direction (e.g., the +z direction).

According to an embodiment, the conductive plate 410 may have a second width W2 in the transverse direction (e.g., the x-axis direction). In an embodiment, the second width W2 of the conductive plate 410 may be greater than or equal to the first width W1 of the conductive patches 310 of the first antenna module 261. For example, the second width W2 may be about 23.8 mm. In an embodiment, the conductive plate 410 may have a first length L1 in the vertical direction (e.g., the y-axis direction). For example, the first length L1 may be about 1.0 mm. For example, the conductive plate 410 has a first edge 410a parallel to the first corner 281 formed by the first surface 231 and the third surface 233 and a second edge 410b perpendicular to the first edge 410a, the first edge 410a may have a second width W2, and the second edge 410b may have a first length L1. In an embodiment, the first length L1 may be greater than or equal to a specific value (e.g., about 0.5 mm).

However, the above-described numerals of the second width W2 and/or the first length L1 of the conductive plate 410 are only examples, and may have various lengths in reality. For example, the first length L1 of the conductive plate 410 in the vertical direction (e.g., the y-axis direction) may have various values between about 0.5 mm and about 1.5 mm.

According to an embodiment, the conductive plate 410 may have a rectangular shape. However, the shape of the conductive plate 410 is not limited to a rectangular shape and may have various shapes.

Figure 5A:
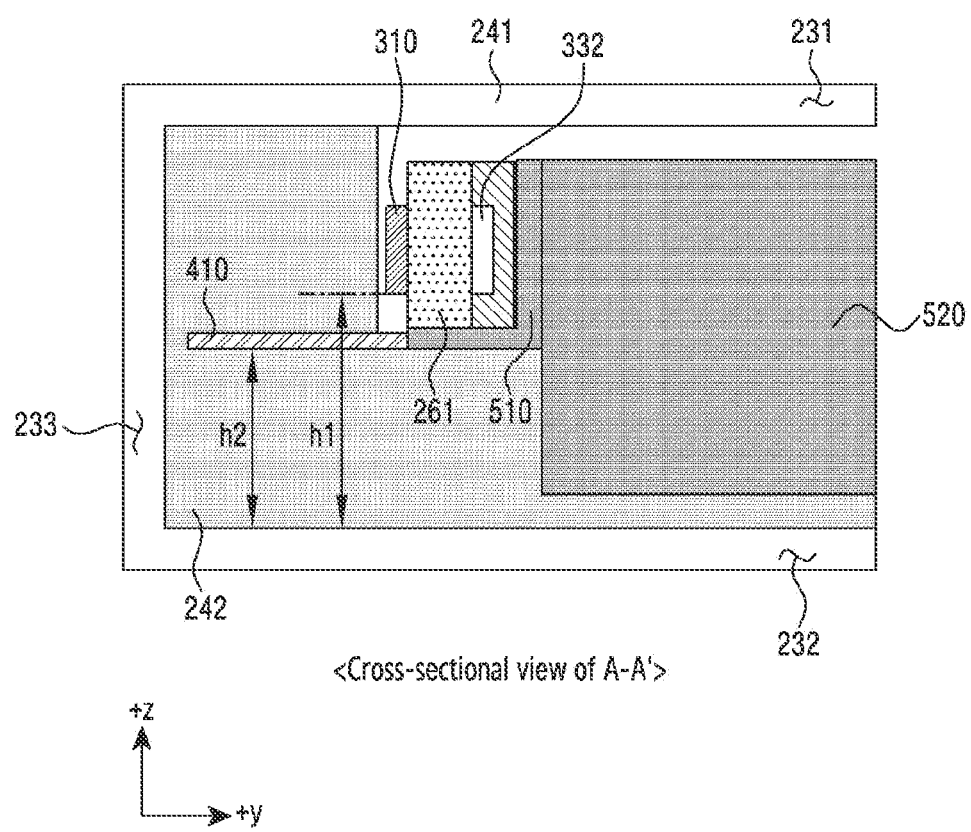
FIG. 5A is a cross-sectional view taken along line A-A' of the portion A shown in FIG. 4 according to an embodiment of the disclosure.

FIG. 5A is a cross-sectional view taken along line A-A' of the portion A shown in FIG. 4 according to an embodiment of the disclosure.

Referring to FIG. 5A, an electronic device 101 according to an embodiment may include a first dielectric 241 and a second dielectric 242. The first dielectric 241 may form a plurality of surfaces of the second housing 212. For example, the first surface 231, the second surface 232, and/or the third surface 233 of the second housing 212 may be formed of the first dielectric 241. The second dielectric 242 may be disposed in an inner space of the electronic device 101, which is formed by the second housing 212. For example, at least a portion of the second dielectric 242 may be disposed between the first antenna module 261 and the third surface 233. Although the first dielectric 241 forming the plurality of surfaces of the second housing 212 and the second dielectric 242 disposed inside the electronic device 101 have been separately described in the embodiment of FIG. 5A, this is only for the convenience of explanation, and in another embodiment, the first dielectric forming the plurality of surfaces of the second housing 212 and the second dielectric disposed in the inner space of the electronic device 101 may be substantially the same or integrally formed. For example, the first dielectric 241 forming the plurality of surfaces of the second housing 212 may also be disposed in the inner space of the second housing 212.

According to an embodiment, the electronic device 101 may include a support member 510, and the support member 510 may fix the first antenna module 261 to form a beam in a third direction (e.g., the −y direction). In an embodiment, the conductive patches 310 of the first antenna module 261 may have a first height h1 from the second surface 232 of the second housing 212. In an embodiment, the support member 510 may be at least partially formed of coated or tinted glass, ceramic, polymer, metal (e.g., aluminum, stainless steel (STS), or magnesium), or a combination of at least two of the above materials.

According to an embodiment, the conductive plate 410 may have a second height h2 from the second surface 232 of the second housing 212. The second height h2 of the conductive plate 410 may be less than the first height h1 of the conductive patches 310. As will be described later in FIG. 7, since the second height h2 of the conductive plate 410 is less than the first height h1, at least some of the RF signals transmitted and/or received by the conductive patches 310 may be reflected by the conductive plate 410. In an embodiment, the electronic device 101 may include a structure 520 disposed adjacent to the first antenna module 261. The structure 520 may include a plurality of electronic components included in the electronic device 101.

According to an embodiment, the conductive plate 410 may come into contact with the support member 510. For example, a separation distance in the y-axis direction may not separately exist between the conductive plate 410 and the first antenna module 261. However, in another embodiment, the conductive plate 410 may be spaced a specific distance apart from the support member 510. Hereinafter, an embodiment in which as the conductive plate 410 and the support member 510 are spaced apart, the conductive plate 410 and the first antenna module 261 are consequently spaced apart from each other will be described with reference to FIG. 6.

Although it has been described in FIG. 5A that the third surface 233 of the second housing 212 is formed of a dielectric or non-conductive material, this is only an example, and in another embodiment, the first surface 231 and/or the third surface 233 of the second housing 212 may be formed of a conductive material (e.g., aluminum). In this case, the first surface and/or the third surface 233 of the second housing 212 may include an opening (or a hole) formed to correspond to the radiation direction of the RF signal of the first antenna module 261, and the opening (or the hole) may be filled with a dielectric or a non-conductive material.

Figure 5B:
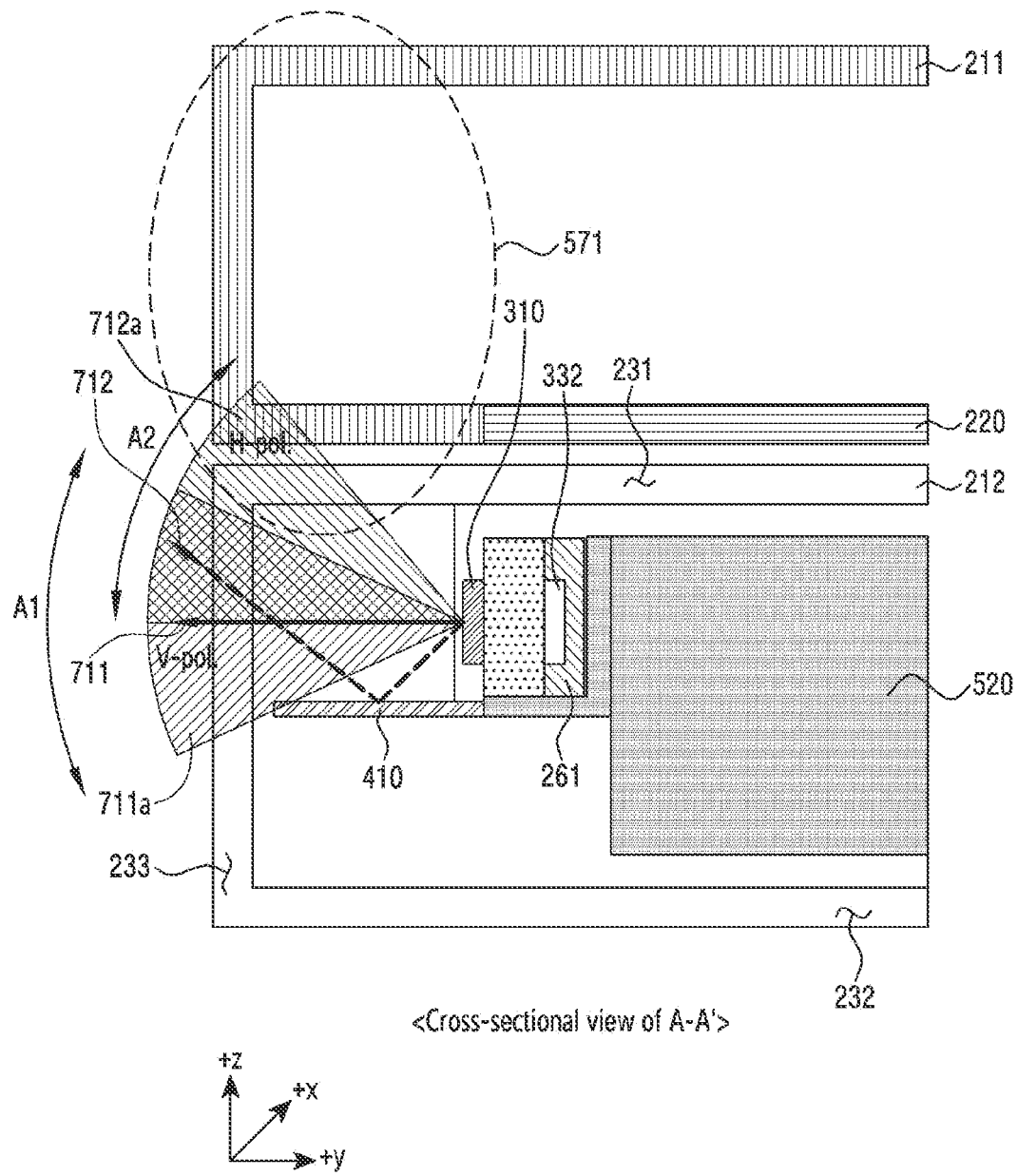
FIG. 5B is a diagram illustrating a first portion of a first housing corresponding to a first antenna module when an electronic device is in a folded state according to an embodiment of the disclosure.

FIG. 5B is a diagram illustrating a first portion of a first housing corresponding to a first antenna module when an electronic device is in a folded state according to an embodiment of the disclosure.

Referring to FIG. 5B, when the electronic device 101 according to an embodiment is in a folded state, the first surface 231 of the second housing and one surface of the first housing (or the display 220) may face each other. The second housing 212 may include a first portion 571 corresponding to the first antenna module 261, and at least a portion of the first portion 571 may be formed of a dielectric and/or a non-conductive material.

Figure 5C:
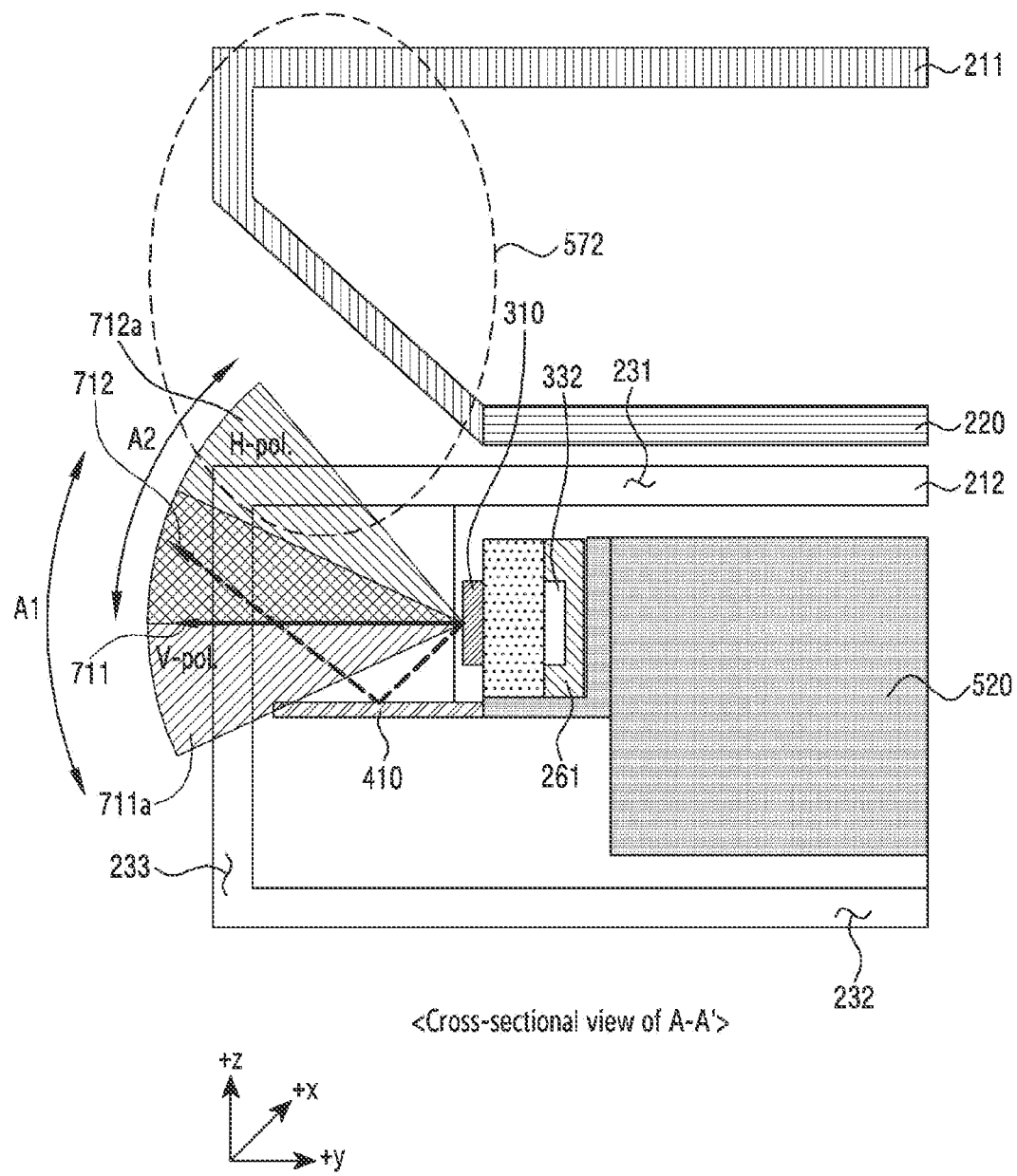
FIG. 5C is a diagram illustrating a first portion of a first housing corresponding to a first antenna module when an electronic device is in a folded state according to an embodiment of the disclosure.

FIG. 5C is a diagram illustrating a first portion of a first housing corresponding to a first antenna module when an electronic device is in a folded state according to an embodiment of the disclosure.

Referring to FIG. 5C, the second housing 512 according to an embodiment may include a second portion 572 corresponding to the first antenna module 261, and the second portion 572 may be at least partially formed in a curved shape to minimize radio frequency (RF) signal radiation of the first antenna module 261.

Figure 6:
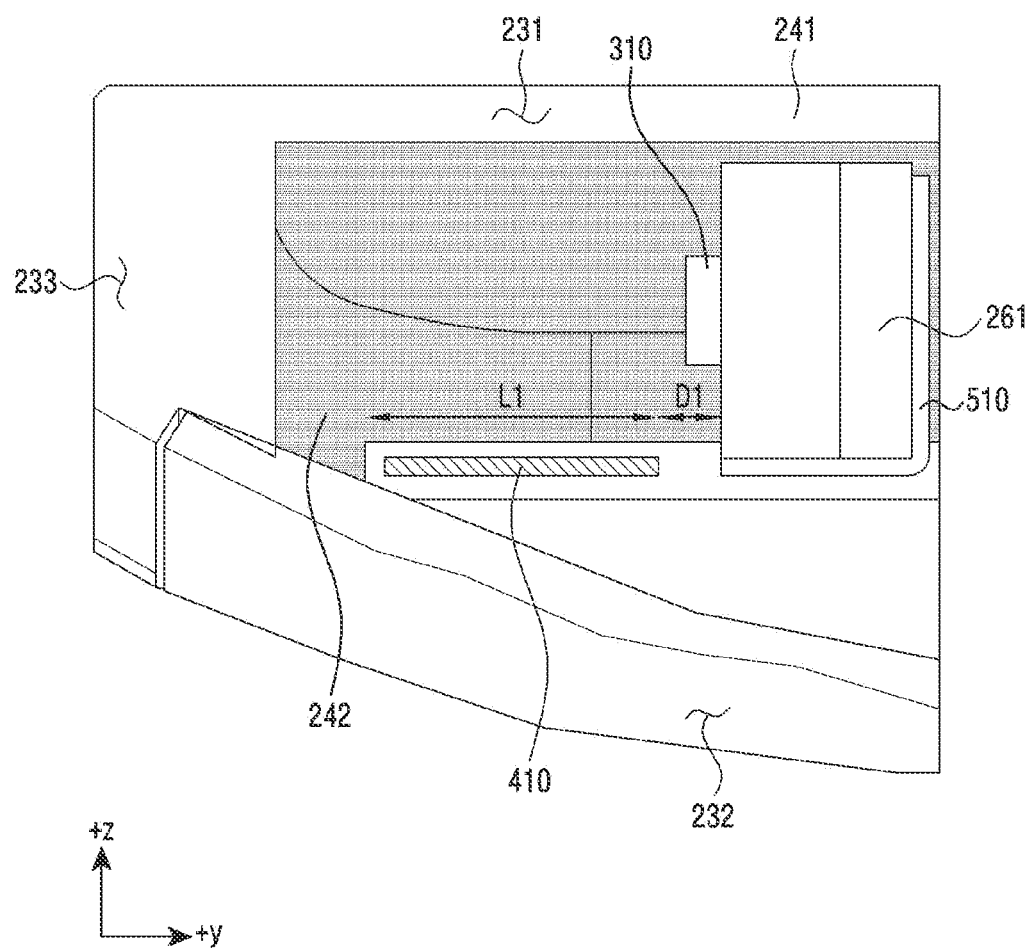
FIG. 6 is a diagram illustrating an example in which a conductive plate and a first antenna module are spaced apart according to an embodiment of the disclosure.

FIG. 6 is a diagram illustrating an example in which a conductive plate and a first antenna module are spaced apart according to an embodiment of the disclosure.

Referring to FIG. 6, the conductive plate 410 having a first length L1 in the vertical direction (e.g., the y-axis direction) according to an embodiment may be space a first distance D1 apart from the first antenna module 261. For example, the first distance D1 may correspond to about 5 mm or less.

Figure 7:
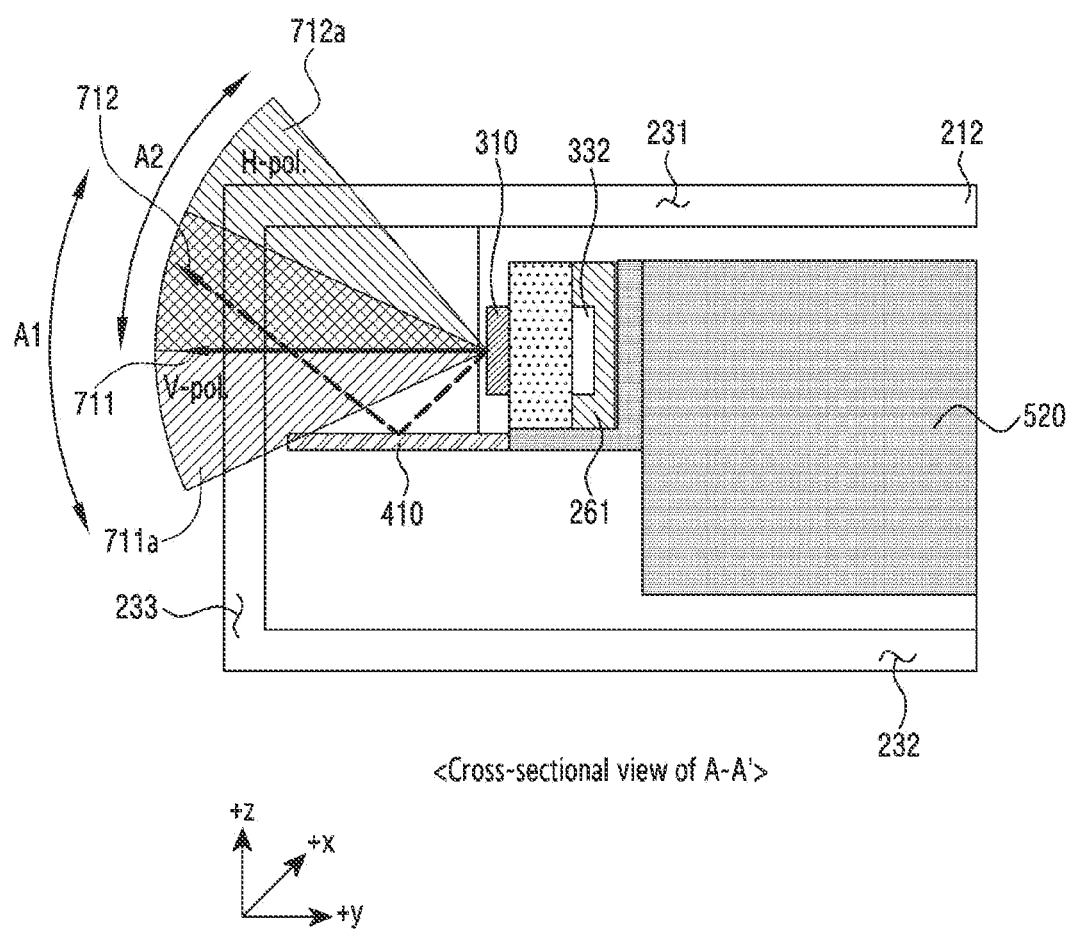
FIG. 7 is a diagram illustrating RF signals reflected by a conductive plate according to an embodiment of the disclosure.

FIG. 7 is a diagram illustrating RF signals reflected by a conductive plate according to an embodiment of the disclosure.

Referring to FIG. 7, the wireless communication circuit 332 according to an embodiment may supply power to the conductive patches 310 to transmit and/or receive an RF signal in a specific frequency band (e.g., 20 GHz or more). In an embodiment, a signal of 20 GHz or more may have polarization characteristics. For example, a first RF signal among the signals of 20 GHz or more may have a polarization characteristic in a first axis direction (e.g., the z-axis direction). As another example, a second signal among the signals of 20 GHz or more may have a polarization characteristic in a second axis direction (e.g., the x-axis direction). In an example, the first axis direction and the second axis direction may be orthogonal to each other. Hereinafter, for convenience of description, it is assumed that the polarization characteristic in the first axis direction (e.g., the z-axis direction) is vertical polarization and that the polarization characteristic in the second direction (e.g., the x-axis direction) is horizontal polarization.

According to an embodiment, the conductive patches 310 may radiate a first signal 711 having a vertical polarization characteristic toward the third surface 233 of the second housing 212. In an embodiment, the radiated first signal 711 may be less affected by the conductive plate 410 than a second signal 712. For example, since the conductive plate 410 is formed parallel to the first surface 231 of the second housing 212 and since the first signal 711 has a vertical polarization characteristic perpendicular to the first surface 231, the first signal 711 may be reflected less than a second signal 712 that will be described later. For example, a first transmission beam 711a of the first signal 711 may have a first beam width A1 and be formed toward the third surface 233.

According to an embodiment, the conductive patches 310 may radiate a second signal 712 having a horizontal polarization characteristic toward the third surface 233 of the second housing 212. At least a portion of the second signal 712 may be reflected by the conductive plate 410. Since the second signal 712 has a polarization characteristic (e.g., horizontal polarization) in a direction (e.g., the x-axis direction) parallel to the conductive plate 410, it may be reflected more by the conductive plate 410 than the first signal 711.

According to an embodiment, a second transmission beam 712a of the second signal 712 may be formed to face in the first direction (e.g., the +z direction) relative to the first transmission beam 711a. For example, the second transmission beam 712a may be formed to have a second beam width A2.

According to an embodiment, since the second signal 712 having a horizontal polarization characteristic is reflected by the conductive plate 410, the electronic device 101 may secure a wider antenna coverage than in the case where the conductive plate 410 is not disposed. For example, in the case where the conductive plate 410 is not disposed between the third surface 233 of the second housing 212 and the first antenna module 261, the signals radiated by the conductive patches 310 may be directed only toward the third surface 233. In this case, the electronic device 101 may secure the antenna coverage corresponding to the first beam width A1. On the other hand, in the case where the conductive plate 410 according to an embodiment is disposed between the third surface 233 and the first antenna module 261, the electronic device 101 may secure antenna coverage corresponding to the first beam width A1 and the second beam width A2 through the first transmission beam 711a having the first beam width A1 and the second transmission beam 712a having the second beam width A2. As a result, the electronic device 101 may secure wide antenna coverage by disposing the conductive plate 410 between the first antenna module 261 and the third surface 233 of the second housing 212.

The radiation directions of the first signal 711 and the second signal 712 shown in FIG. 7, and the ranges of the first transmission beam 711a and the second transmission beam 712a by the first signal 711 and the second signal 712 are only examples for convenience of description, and the disclosure is not limited thereto.

Figure 8:
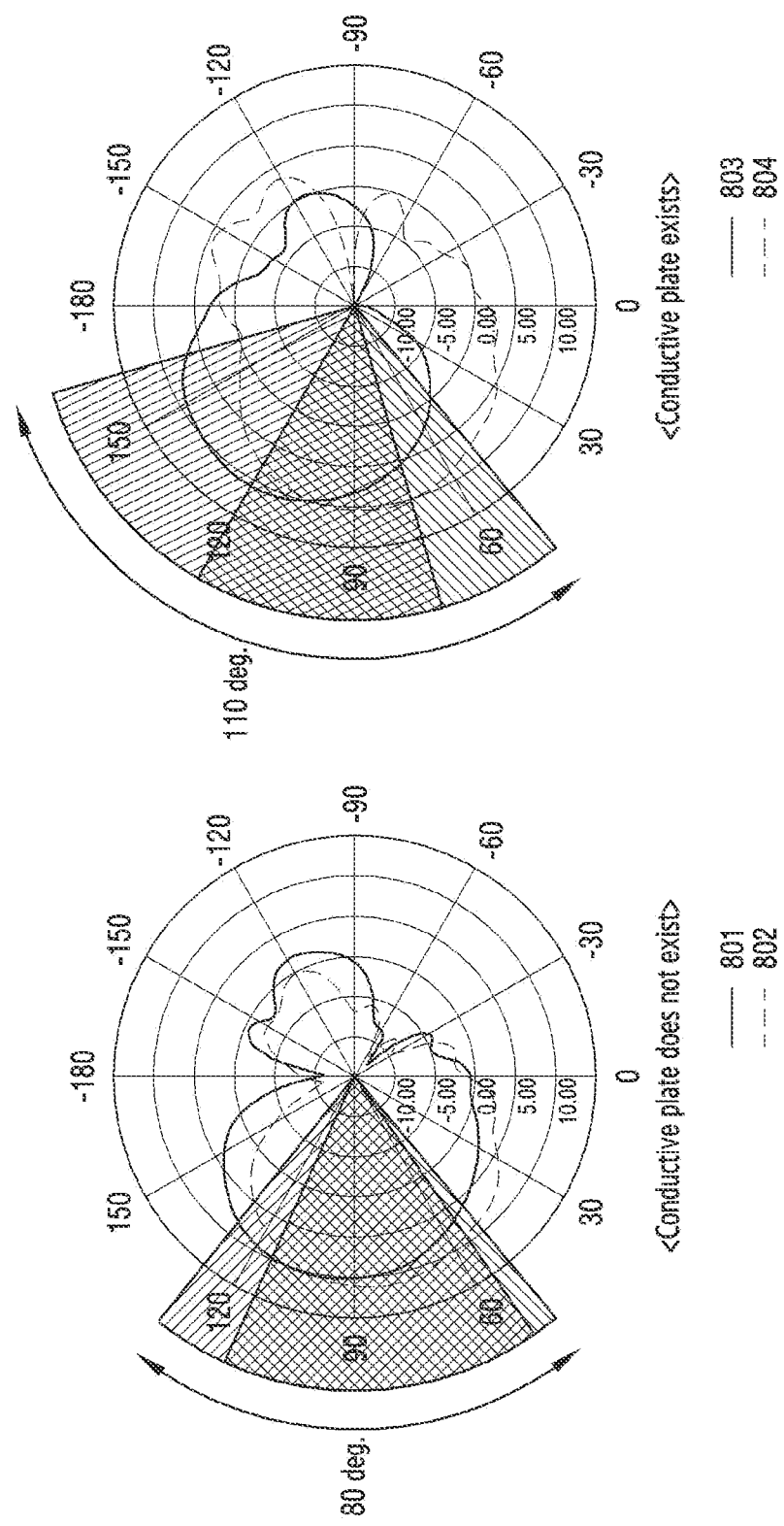
FIG. 8 is a diagram illustrating comparison of beam widths of transmission/reception beams transmitted/received by a first antenna module depending on the presence or absence of a conductive plate according to an embodiment of the disclosure.

FIG. 8 is a diagram illustrating comparison of beam widths of transmission/reception beams transmitted/received by a first antenna module depending on the presence or absence of a conductive plate according to an embodiment of the disclosure.

Referring to FIG. 8, a first graph 801 shows a radiation pattern of a signal having a horizontal polarization characteristic in the case where the conductive plate 410 is not disposed between the first antenna module 261 and the third surface 233 of the second housing 212. A second graph 802 shows a radiation pattern of a signal having a vertical polarization characteristic in the case where the conductive plate 410 is not disposed. Referring to the first graph 801 and the second graph 802, when the conductive plate 410 is not disposed, the beam width (half power beam width (HPBW)) of a transmission/reception beam formed by the first antenna module 261 may be about 80 degrees.

According to an embodiment, a third graph 803 shows a radiation pattern of a second signal 712 having a horizontal polarization characteristic when the conductive plate 410 is disposed. In an embodiment, a fourth graph 804 shows a radiation pattern of a first signal 711 having a vertical polarization characteristic when the conductive plate 410 is disposed. In an embodiment, referring to the third graph 803 and the fourth graph 804, when the conductive plate 410 is disposed, the beam width (HPBW) of a transmission/reception beam formed by the first antenna module 261 may be about 110 degrees.

As a result, the electronic device 101 may secure a wider antenna coverage in the case of including the conductive plate 410 than in the case of not including the conductive plate 410.

Figure 9:
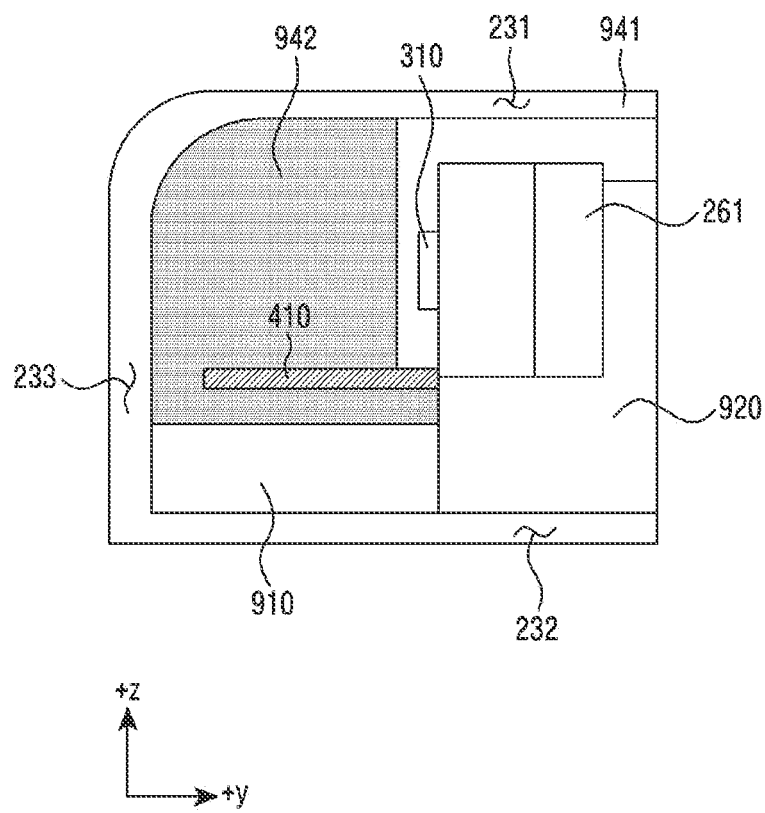
FIG. 9 is a diagram illustrating an electronic device further including a conductive structure disposed under a conductive plate according to an embodiment of the disclosure.

FIG. 9 is a view illustrating an electronic device further including a conductive structure disposed under a conductive plate according to an embodiment of the disclosure.

Referring to FIG. 9, the electronic device 101 according to an embodiment may include a conductive structure 910. The conductive structure 910 may be disposed between the second surface 232 of the second housing 212 and the conductive plate 410. For example, it may be disposed in a downward direction (e.g., the −z direction) of the conductive plate 410. In an embodiment, the conductive structure 910 may reflect an RF signal having a horizontal polarization characteristic among the signals radiated from the first antenna module 261.

In an embodiment, the electronic device 101 may include a support member 920. The support member 920 may fix the first antenna module 261 such that the first antenna module 261 may form a beam toward the third surface 233 of the second housing 212.

Although the conductive structure 910 and the support member 920 are illustrated as separate elements in the embodiment of FIG. 9, the conductive structure 910 may extend from the support member 920 in another embodiment.

According to an embodiment, the electronic device 101 may include a first dielectric 941 forming side surfaces (e.g., a first surface 231) of the second housing 212 and/or a second dielectric 942 disposed inside the second housing 212. The first dielectric 941 and the second dielectric 942 may correspond to the first dielectric 241 and the second dielectric 242 described above with reference to FIG. 5A, respectively.

Figure 10:
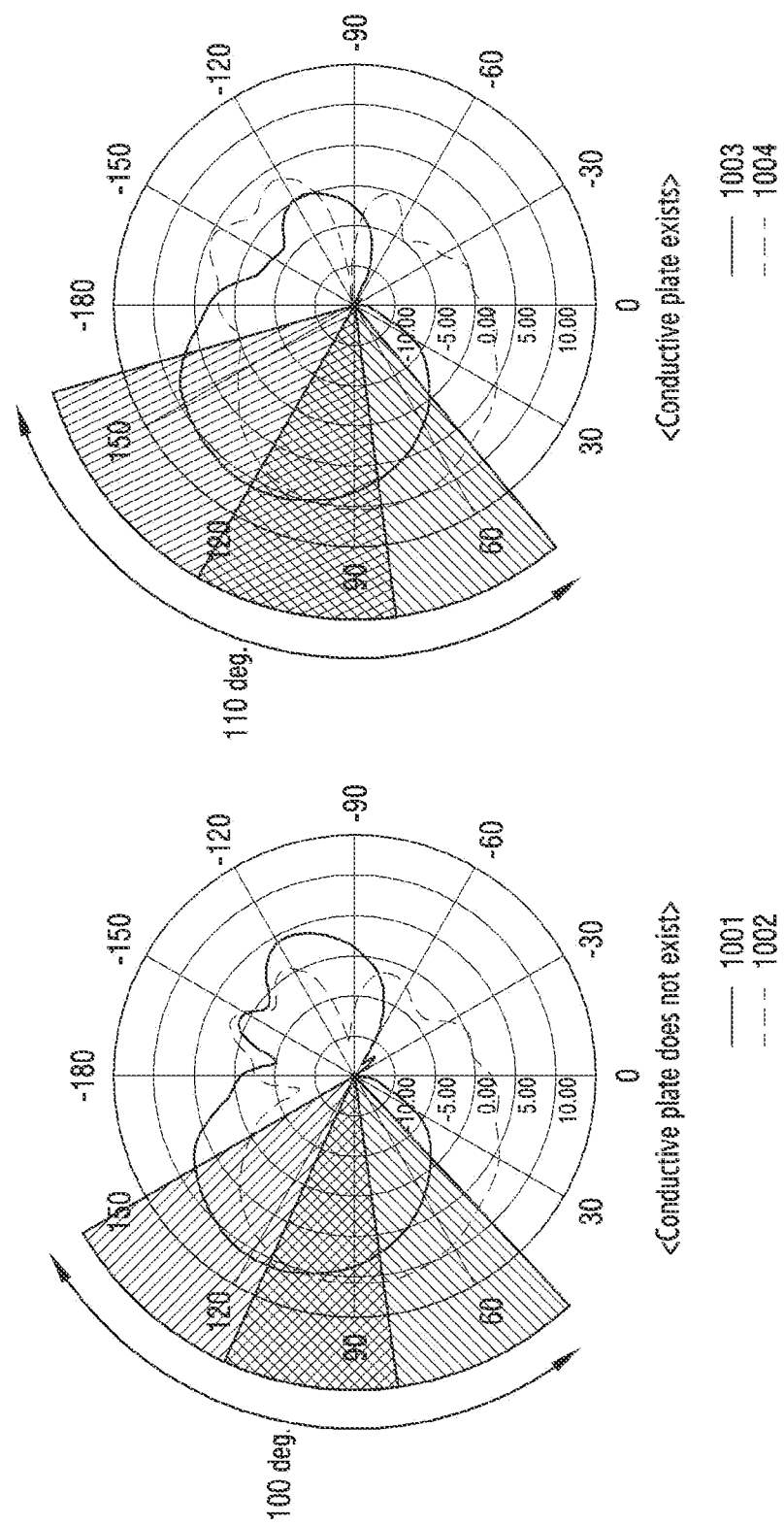
FIG. 10 is a diagram illustrating comparison of beam widths of transmission/reception beams transmitted/received by a first antenna module depending on the presence or absence of a conductive plate, based on the embodiment shown in FIG. 9 including a conductive structure according to an embodiment of the disclosure.

FIG. 10 is a diagram illustrating comparison of beam widths of transmission/reception beams transmitted/received by a first antenna module depending on the presence or absence of a conductive plate, based on the embodiment shown in FIG. 9 including a conductive structure according to an embodiment of the disclosure.

Referring to FIG. 10, a first graph 1001 shows a radiation pattern of a signal having a horizontal polarization characteristic when the conductive plate 410 is not disposed between the first antenna module 261 and the third surface 233 of the second housing 212. A second graph 1002 shows a radiation pattern of a signal having a vertical polarization characteristic when the conductive plate 410 is not disposed. Referring to the first graph 1001 and the second graph 1002, when the conductive plate 410 is not disposed, the beam width (HPBW) of a transmission/reception beam formed by the first antenna module 261 may be about 100 degrees. The reason why this has a beam width of about 100 degrees, unlike FIG. 8, even without the conductive plate 410 may be due to the fact that the conductive structure 910 reflects signals of the first antenna module 261.

According to an embodiment, a third graph 1003 shows a radiation pattern of a second signal 712 having a horizontal polarization characteristic when the conductive plate 410 is disposed. In an embodiment, a fourth graph 1004 shows a radiation pattern of a first signal 711 having a vertical polarization characteristic when the conductive plate 410 is disposed. In an embodiment, referring to the third graph 1103 and the fourth graph 1104, when the conductive plate 410 is disposed, a beam width (HPBW) of a transmission/reception beam formed by the first antenna module 261 may be about 110 degrees.

As a result, the electronic device 101 may secure a wider antenna coverage in the case of including the conductive plate 410 than in the case of not including the conductive plate 410.

Figure 11:
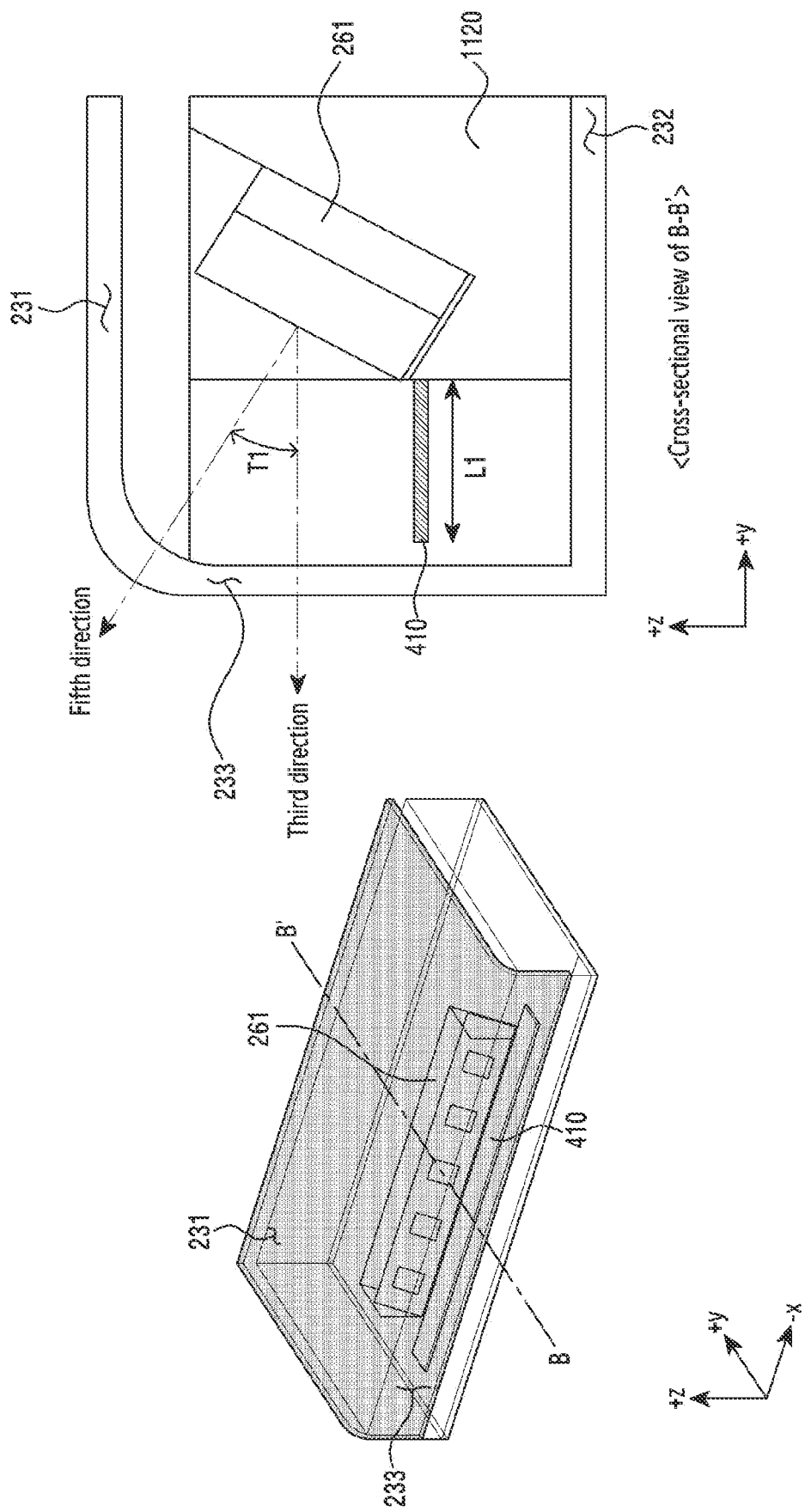
FIG. 11 is a diagram illustrating a first antenna module facing in a fifth direction forming a specific angle with a third direction perpendicular to a third surface of a second housing according to an embodiment of the disclosure.

FIG. 11 is a diagram illustrating a first antenna module facing in a fifth direction forming a specific angle with a third direction perpendicular to a third surface of a second housing according to an embodiment of the disclosure.

Referring to FIG. 11, an electronic device 101 according to an embodiment may include a support member 1120 for fixing the first antenna module 261. The support member 1120 according to an embodiment, unlike the support member 510 in FIG. 5A, may fix the first antenna module 261 so as to form a beam in a fifth direction forming a specific angle T1 (e.g., about 45 degrees) with a third direction (e.g., the −y direction). For example, the specific angle T1 may correspond to an acute angle of about 0 to 90 degrees or less.

According to an embodiment, since the first antenna module 261 forms a beam in the fifth direction, the electronic device 101 may secure a wider antenna coverage. For example, the electronic device 101 may be a notebook computer, and an obstruction (e.g., a desk) that interferes with signal transmission and/or reception may be placed in a downward direction (e.g., the −z direction) of the second housing 212 disposed in the first antenna module 261 in a general environment in which the electronic device 101 is used. For example, when the first antenna module 261 faces the third direction (e.g., the −y direction), the antenna coverage may be reduced due to the obstruction.

On the other hand, in the case where the first antenna module 261 according to an embodiment faces in the fifth direction forming a specific angle T1 with the third direction (e.g., the −y direction), a decrease in the antenna coverage due to the obstruction may be reduced, compared to the case where the first antenna module 261 faces in the third direction (e.g., the −y direction). For example, the electronic device 101 may secure a wider antenna coverage by disposing the first antenna module 261 to be tilted at a specific angle T1.

Figure 12A:
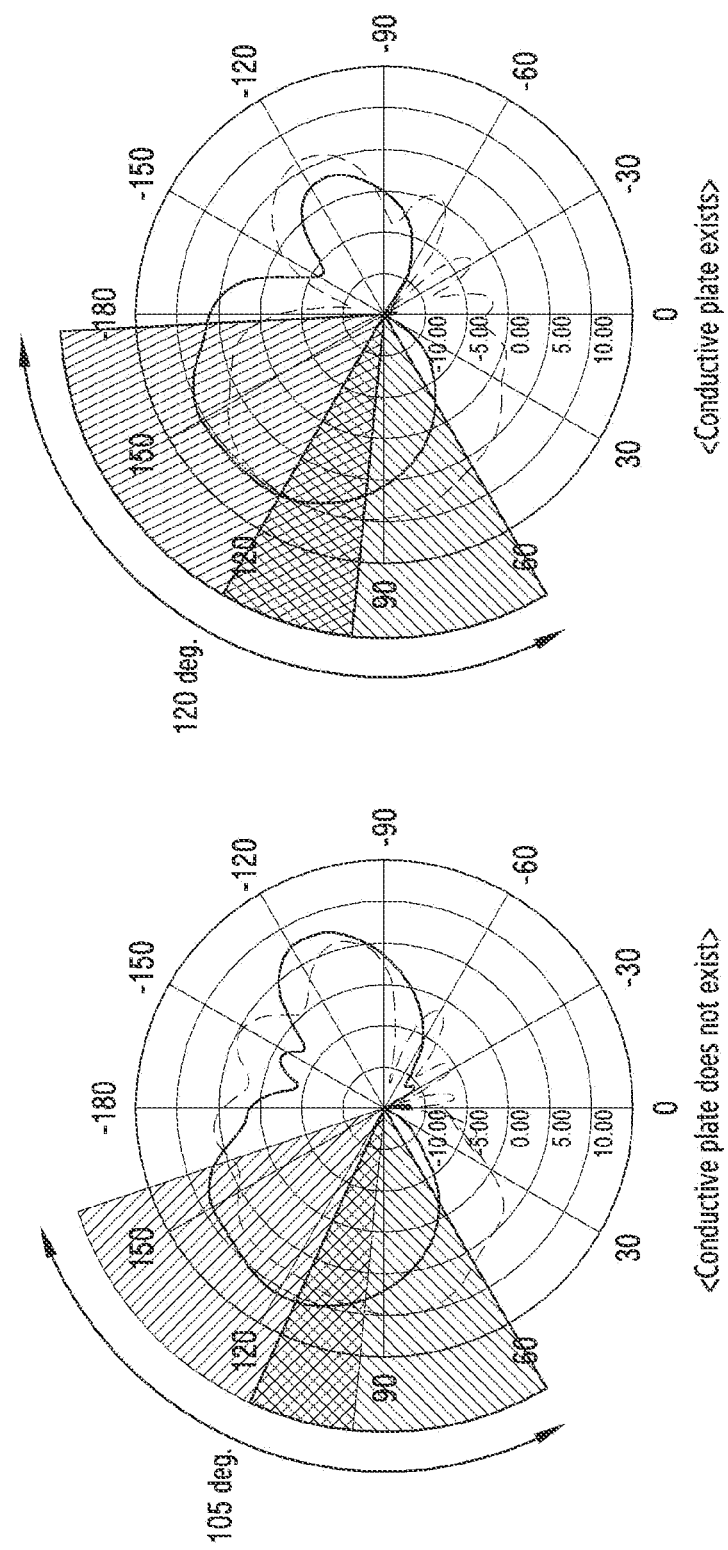
FIG. 12A is a diagram illustrating comparison of beam widths of transmission/reception beams depending on the presence or absence of a conductive plate, based on the first antenna module facing in the fifth direction shown in FIG. 11 according to an embodiment of the disclosure.

FIG. 12A is a diagram illustrating comparison of beam widths of transmission/reception beams depending on the presence or absence of a conductive plate, based on the first antenna module forming a beam in the fifth direction shown in FIG. 11 according to an embodiment of the disclosure.

Referring to FIG. 12A, in the case where a conductive plate 410 is not disposed between the first antenna module 261 and the third surface 233 of the second housing 212, a beam width of a transmission/reception beam formed by the first antenna module 261 may be 105 degrees.

According to an embodiment, in the case where the conductive plate 410 is disposed between the first antenna module 261 and the third surface 233 of the second housing 212 and where the conductive plate 410 has a first length L1 of about 1.5 mm in the vertical direction (e.g., the y-axis direction in FIG. 11), a beam width of a transmission/reception beam formed by the first antenna module 261 may be about 120 degrees. As a result, the electronic device 101 may secure a wider antenna coverage in the case of disposing the conductive plate 410 between the first antenna module 261 and the third surface 233 than in the case of not including the conductive plate 410.

Figure 12B:
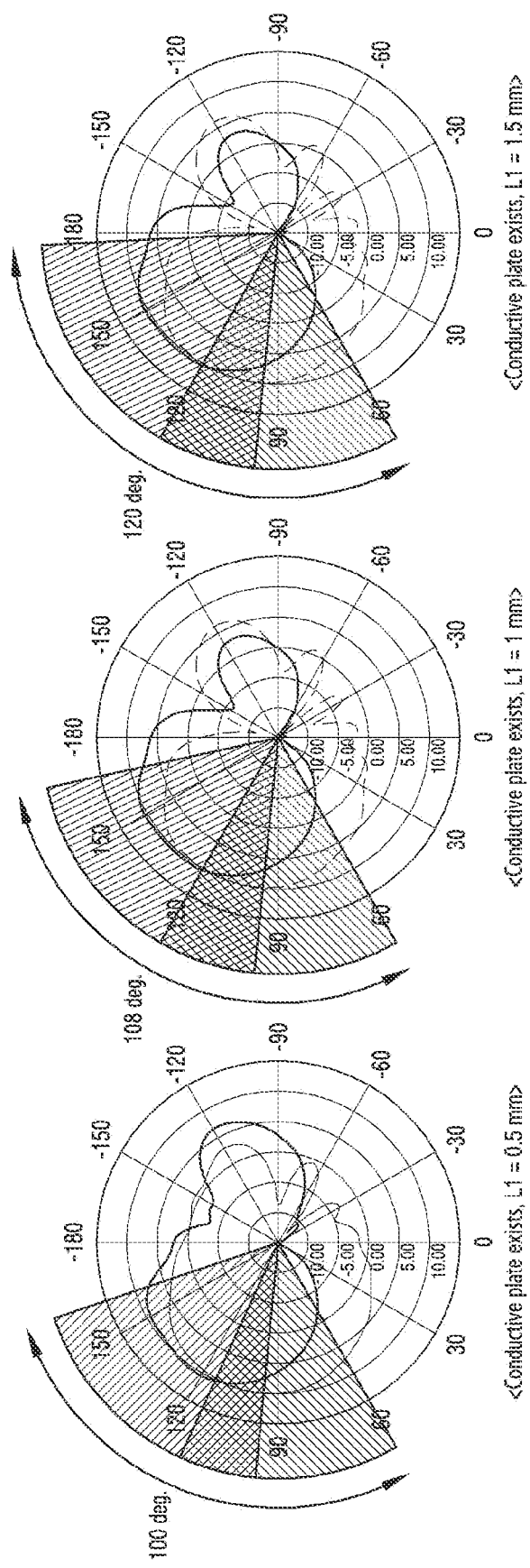
FIG. 12B is a diagram illustrating comparison of beam widths of transmission/reception beams depending on a length of a conductive plate in a longitudinal direction according to an embodiment of the disclosure.

FIG. 12B is a diagram illustrating comparison of beam widths of transmission/reception beams depending on a length of a conductive plate in a vertical direction according to an embodiment of the disclosure.

Referring to FIG. 12B, under the common condition in which a conductive plate 410 is disposed between the first antenna module 261 and the third surface 233 of the second housing 212 according to an embodiment, a beam width of a transmission/reception beam formed by the first antenna module 261 may vary depending on a first length L1 of the conductive plate 410 in the vertical direction (e.g., the y-axis direction in FIG. 11). For example, when the first length L1 is about 0.5 mm, the beam width of a transmission/reception beam formed by the first antenna module 261 may be about 100 degrees. As another example, when the first length L1 is about 1 mm, the beam width of a transmission/reception beam formed by the first antenna module 261 may be about 108 degrees. As another example, when the first length L1 is about 1.5 mm, the beam width of a transmission/reception beam formed by the first antenna module 261 may be about 120 degrees.

For example, as the first length L1 of the conductive plate 410 in the vertical direction is longer, the electronic device 101 may secure a wider antenna coverage.

Figure 13:
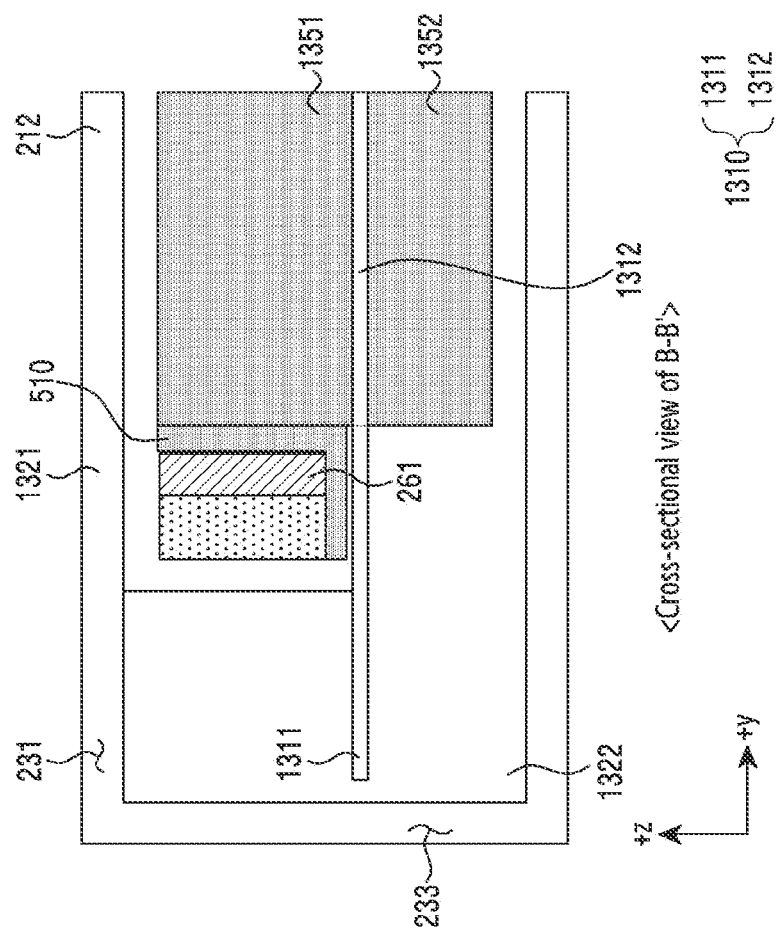
FIG. 13 is a diagram illustrating an example in which a conductive layer of a main printed circuit board extends in a third direction and in which signals transmitted/received by a first antenna module are reflected by the conductive layer according to an embodiment of the disclosure.
Figure 13:
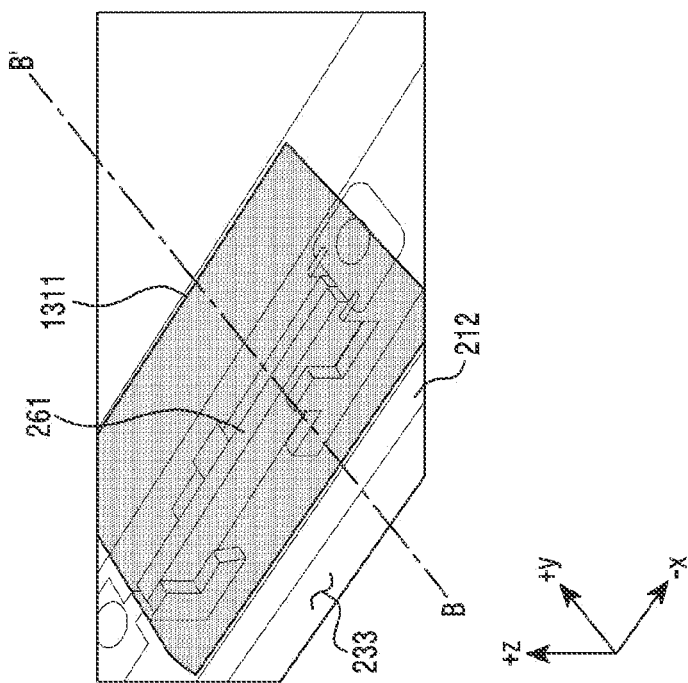

FIG. 13 is a diagram illustrating an example in which a conductive layer of a main printed circuit board extends in a third direction and in which signals transmitted/received by a first antenna module are reflected by the conductive layer according to an embodiment of the disclosure.

Referring to FIG. 13, the electronic device 101 according to an embodiment may include a main printed circuit board 1310, and the main printed circuit board 1310 may be disposed adjacent to the first antenna module 261.

In an embodiment, referring to the cross-sectional view of B-B', the main printed circuit board 1310 may include a first portion 1311 and a second portion 1312. For example, the main printed circuit board 1310 may include a first portion 1311 positioned in a downward direction (e.g., the −z direction) of the first antenna module 261 and extending long in the y-axis direction. As another example, the main printed circuit board 1310 may include a second portion 1312 extending from the first portion 1311 in a fourth direction (e.g., the +y direction).

According to an embodiment, a first conductive structure 1351 may be disposed in an upward direction (e.g., the +z direction) of the second portion 1312 of the main printed circuit board 1310, and a second conductive structure 1352 may be disposed in a downward direction (e.g., the −z direction) of the second portion 1312. In an embodiment, the first conductive structure 1351 and/or the second conductive structure 1352 may be various electronic components in the electronic device 101. For example, the first conductive structure 1351 and/or the second conductive structure 1352 may correspond to electronic components (e.g., the processor 120 and the battery 189) disposed on the main printed circuit board 1310. As another example, the first conductive structure 1351 and/or the second conductive structure 1352 may correspond to support members for fixing electronic components in the electronic device 101.

In an embodiment, the electronic device 101 may include a first dielectric 1321 forming the second housing 212 and/or a second dielectric 1322 disposed inside the second housing 212. The first dielectric 1321 and the second dielectric 1322 may correspond to the first dielectric 241 and the second dielectric 242, respectively, described above with reference to FIG. 5A.

According to an embodiment, the first portion 1311 of the main printed circuit board 1310 may reflect an RF signal in a specific frequency band (e.g., 20 GHz or more), which is transmitted and/or received by the first antenna module 261. For example, the first antenna module 216 may transmit and/or receive RF signals toward the third surface 233 of the second housing 212. In an example, a first signal having a horizontal polarization characteristic among the RF signals transmitted and/or received by the first antenna module 261 may be reflected by the first portion 1311. For example, the first portion 1311 of the main printed circuit board 1310 may have substantially the same effect as the conductive plate 410 described with reference to FIGS. 4, 5A to 5C, 6 to 11, 12A, and 12B.

Accordingly, the electronic device 101 may secure a wider antenna coverage through the first portion 1311, compared to the case in which the first portion 1311 is not disposed. As another example, the electronic device 101 may reflect RF signals using the first portion 1311 extending from the main printed circuit board 1310, thereby reducing material cost, compared to the case where a separate conductive plate 410 is disposed.

Figure 14:
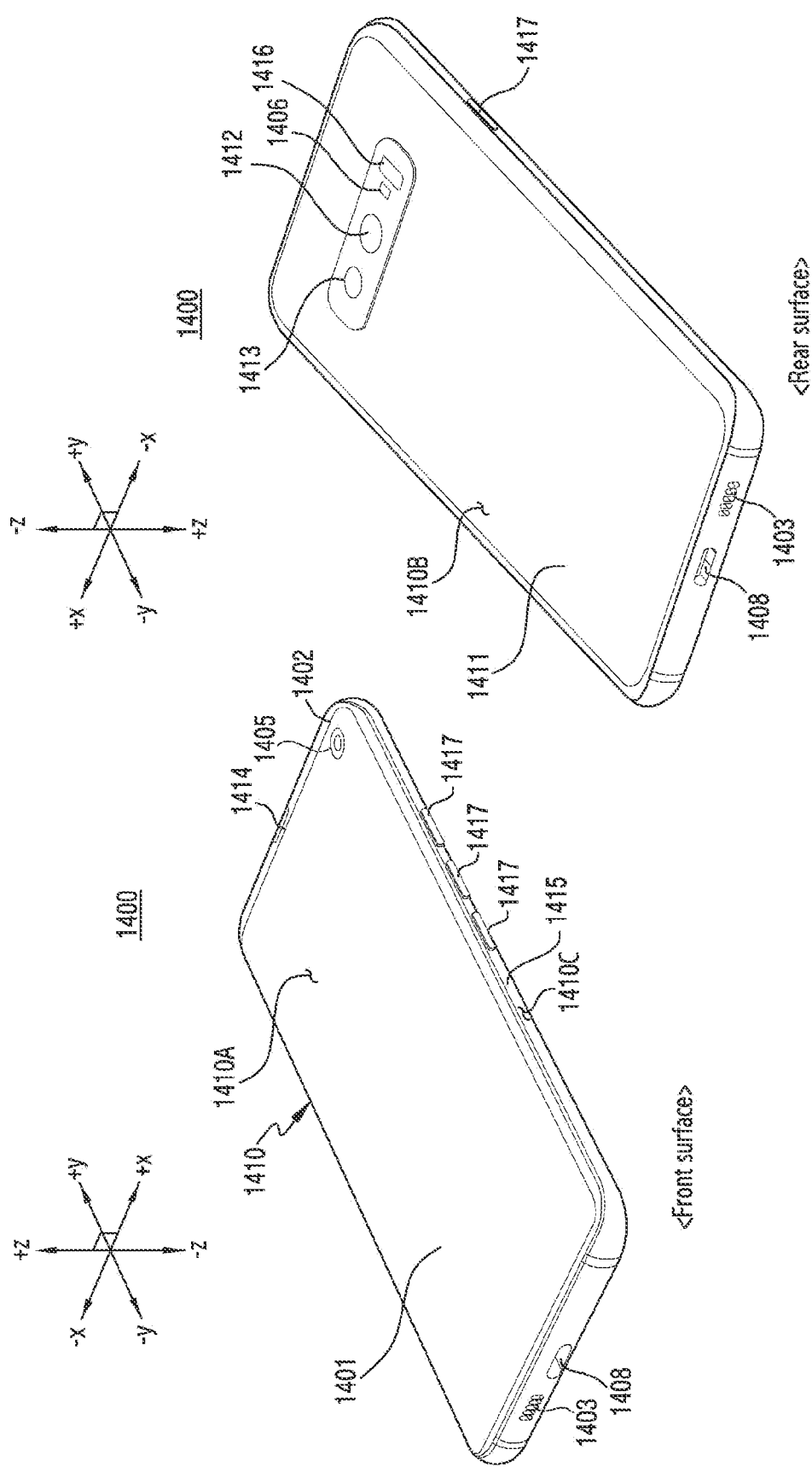
FIG. 14 is a perspective view illustrating a front surface and a rear surface of an electronic device according to an embodiment of the disclosure.

FIG. 14 is a perspective view illustrating a front surface and a rear surface of an electronic device according to an embodiment of the disclosure.

Referring to FIG. 14, a mobile communication device 1400 according to an embodiment may include a housing 1410 including a first surface (or front surface) 1410A, a second surface (or rear surface) 1410B, and a side surface (or sidewall) 1410C surrounding a space between the first surface 1410A and the second surface 1410B. In another embodiment (not shown), the housing may indicate a structure forming a portion of the first surface 1410A, the second surface 1410B, and the side surface 1410C in FIGS. 3A and 3B.

According to an embodiment, the first surface 1410A of the mobile communication device 1400 may be formed by a front plate 1402 (e.g., a glass plate including various coating layers, or a polymer plate) in which at least a portion thereof is substantially transparent. In an embodiment, the front plate 1402 may include a curved portion extending seamlessly from the first surface 1410A to a rear cover 1411 to be bent in at least one side edge portion.

According to an embodiment, the second surface 1410B may be formed by a substantially opaque rear cover 1411. The rear cover 1411 may be formed of, for example, coated or tinted glass, ceramic, polymer, metal (e.g., aluminum, stainless steel (STS), or magnesium), or a combination of at least two of the above materials. According to an embodiment, the rear cover 1411 may include a curved portion extending seamlessly from the second surface 1410B to the front plate 1402 to be bent in at least one side edge portion.

According to an embodiment, the side surface 1410C of the mobile communication device 1400 may be connected to the front plate 1402 and the rear cover 1411 and may be formed in a frame structure 1415 including metal and/or polymer. In another embodiment, the rear cover 1411 and the frame structure 1415 may be integrally formed and may include substantially the same material (e.g., a metal material such as aluminum). For example, the housing of the mobile communication device 1400 may include a first portion including the side surface 1410C and a second portion forming the rear surface 1410B. According to an embodiment, at least a portion of the frame structure 1415 may be formed of a non-conductive material (e.g., polymer). In another embodiment, the frame structure 1415 may be formed of a conductive material (e.g., aluminum).

According to an embodiment, the mobile communication device 1400 may include at least one of a display 1401, an audio module 170, a sensor module, a first camera module 1405, a key input device 1417, and a connector hole 1408. In another embodiment, the mobile communication device 1400 may exclude at least one (e.g., the key input device 1417) of the elements or further include other elements. For example, the mobile communication device 1400 may include a sensor module that is not shown. For example, a sensor such as a proximity sensor or an illuminance sensor may be integrated into the display 1401 or disposed adjacent to the display 1401 within an area provided by the front plate 1402. In another embodiment, the mobile communication device 1400 may further include a light-emitting element, and the light-emitting element may be disposed adjacent to the display 1401 within an area provided by the front plate 1402. The light-emitting device may provide, for example, state information of the mobile communication device 1400 in the form of light. In another embodiment, the light-emitting device may provide, for example, a light source that is associated with the operation of the first camera module 1405. The light-emitting element may include, for example, an LED, an IR LED, and/or a xenon lamp.

The display 1401 may be exposed, for example, through a substantial portion of the front plate 1402. In another embodiment, the edges of the display 1401 may be formed to be substantially the same as an adjacent periphery shape (e.g., a curved surface) of the front plate 1402. In another embodiment, in order to expand the area to which the display 1401 is exposed, the distance between the periphery of the display 1401 and the periphery of the front plate 1402 may be configured to be substantially the same. In another embodiment, a recess or an opening may be formed in a portion of a screen display area of the display 1401, and another electronic component aligned with the recess or the opening, for example, a first camera module 1405, a proximity sensor (not shown), or an illuminance sensor (not shown) may be included.

In another embodiment, at least one of a second camera module 1412, a third camera module 1413, a fingerprint sensor 1416, and a flash 1406 may be included on a rear surface of the screen display area of the display 1401. In another embodiment, the display 1401 may be coupled to or disposed adjacent to a touch detection circuit, a pressure sensor capable of measuring the intensity (pressure) of a touch, and/or a digitizer detecting a magnetic-field type stylus pen.

In an embodiment, the audio module 170 may include a microphone hole and a speaker hole. A microphone for acquiring an external sound may be disposed in the microphone hole, and in an embodiment, a plurality of microphones may be disposed to detect the direction of sound. In an embodiment, the speaker hole and the microphone hole may be implemented as one hole 1403, or a speaker may be provided without a speaker hole (e.g., a piezo speaker). The speaker hole may include an external speaker hole and a receiver hole 1414 for a call.

In an embodiment, the mobile communication device 1400 may include a sensor module (not shown) to produce an electrical signal or data value corresponding to an internal operation state of the mobile communication device 1400 or an external environmental state. The sensor module may further include, for example, a proximity sensor disposed on the first surface 1410A of the housing 1410, a fingerprint sensor integrated into or disposed adjacent to the display 1401, and/or a biometric sensor (e.g., an HRM sensor) disposed in the second surface 1410B of the housing 1410. The mobile communication device 1400 may further include a sensor module, which is not shown, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, and an illuminance sensor.

In an embodiment, the mobile communication device 1400 may include a second camera module 1412, a third camera module 1413, and/or a flash 1406 disposed on the second surface 1410B. The first camera module 1405, the second camera module 1412, and/or the third camera module 1413 may include one or more lenses, an image sensor, and/or an image signal processor. In an embodiment, the mobile communication device 1400 may include a flash 1406. The flash 1406 may include, for example, a light-emitting diode or a xenon lamp. In another embodiment, two or more lenses (an infrared camera, or wide-angle and telephoto lenses) and image sensors may be disposed on one surface of the mobile communication device 1400.

In an embodiment, the key input device 1417 may be disposed on the side surface 1410C of the housing 1410. In another embodiment, the mobile communication device 1400 may exclude some or all of the above-mentioned key input devices 1417 and the excluded key input device 1417 may be implemented in other forms such as soft keys or the like on the display 1401. In another embodiment, the key input device may include at least a portion of the fingerprint sensor 1416 disposed on the second surface 1410B of the housing 1410.

In an embodiment, the connector hole 1408 may receive a connector for transmitting and/or receiving power and/or data to and/or from an external electronic device, and/or a connector for transmitting and/or receiving an audio signal to and/or from an external electronic device. For example, the connector hole 1408 may include a USB connector or an earphone jack.

Figure 15:
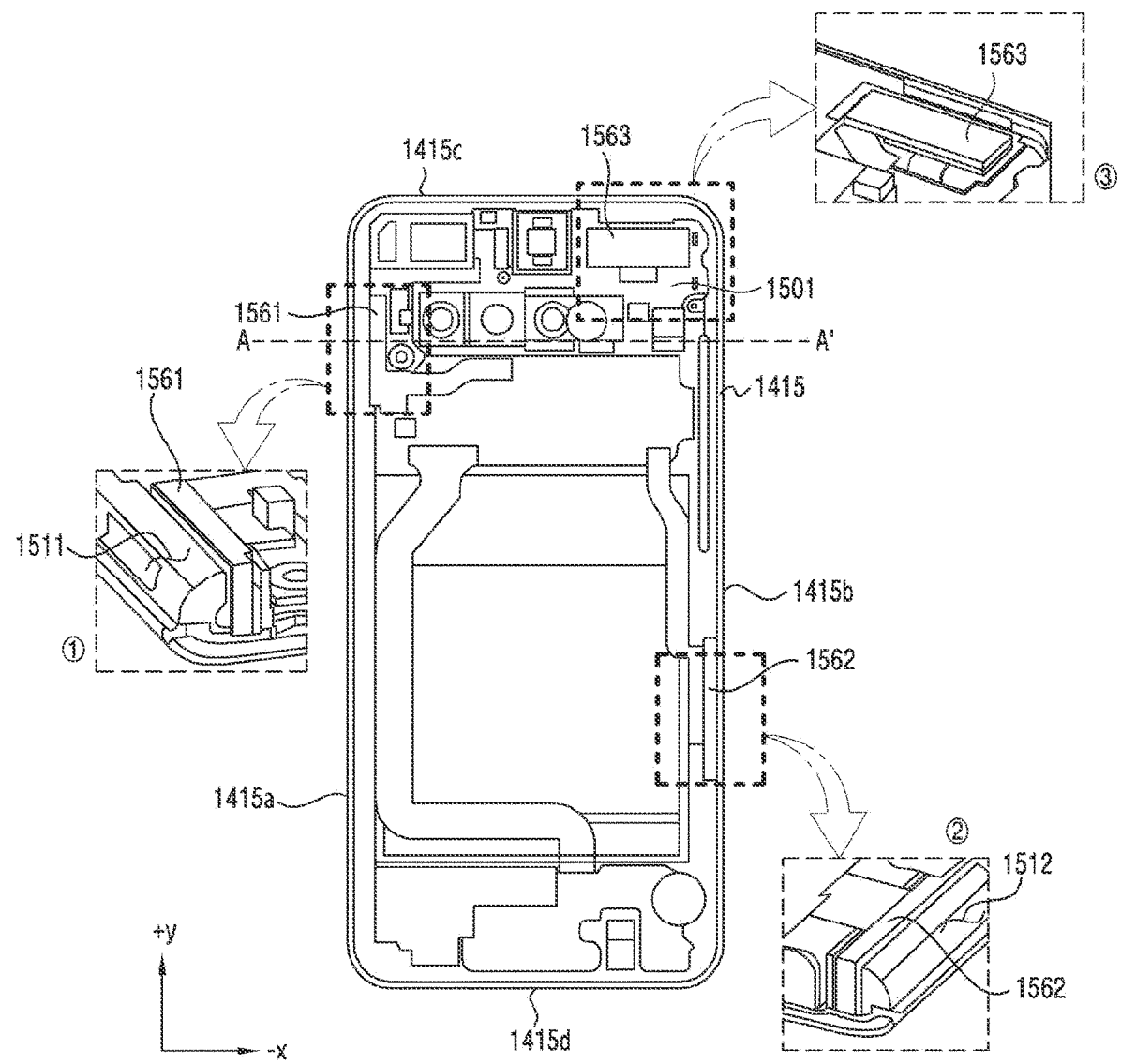
FIG. 15 is a diagram illustrating the positions of antenna modules disposed inside the electronic device shown in FIG. 14 according to an embodiment of the disclosure.

FIG. 15 is a diagram illustrating the positions of antenna modules disposed inside the electronic device shown in FIG. 14 according to an embodiment of the disclosure.

Referring to FIG. 15, a mobile communication device 1400 according to an embodiment may include a first antenna module 1561, a second antenna module 1562, and/or a third antenna module 1563. In an embodiment, the first antenna module 1561, the second antenna module 1562 and/or the third antenna module 1563 may have substantially the same configuration and structure as the first antenna module 261 shown in FIG. 3A.

According to an embodiment, the first antenna module 1561 and/or the second antenna module 1562 may be disposed adjacent to the frame structure 1415. For example, the frame structure 1415 may include a first frame 1415a, a second frame 1415b, a third frame 1415c, and a fourth frame 1415d. In one example, the first antenna module 1561 may be disposed adjacent to the first frame 1415a forming a first side surface 1511 of the mobile communication device 1400. As another example, the second antenna module 1562 may be disposed adjacent to the second frame 1415b forming a second side surface 1512 of the mobile communication device 1400.

According to an embodiment, the first antenna module 1561 may be disposed to form a directional beam toward the first side surface 1511 in order to secure a mounting space for an electronic component (e.g., the battery 189) of the mobile communication device 1400 and antenna radiation performance. As another example, the second antenna module 1562 may be disposed to form a directional beam toward the second side surface 1512. However, the disposed positions and arrangement structures of the first antenna module 1561 and/or the second antenna module 1562 are not limited to the positions and structures shown in FIG. 15, the first antenna module 1561 and/or the second antenna module 1562 may be disposed at various positions in various arrangement structures within the mobile communication device 1400.

According to an embodiment, the third antenna module 1563 may be disposed to form a beam in a direction substantially perpendicular to a printed circuit board 1501 disposed inside the mobile communication device 1400. For example, the third antenna module 1563 may be disposed to form a directional beam toward the rear surface 1410B of the mobile communication device 1400. The position and structure of the third antenna module 1563 in the mobile communication device 1400 shown in FIG. 15 are only examples, and the disclosure is not limited thereto.

Figure 16:
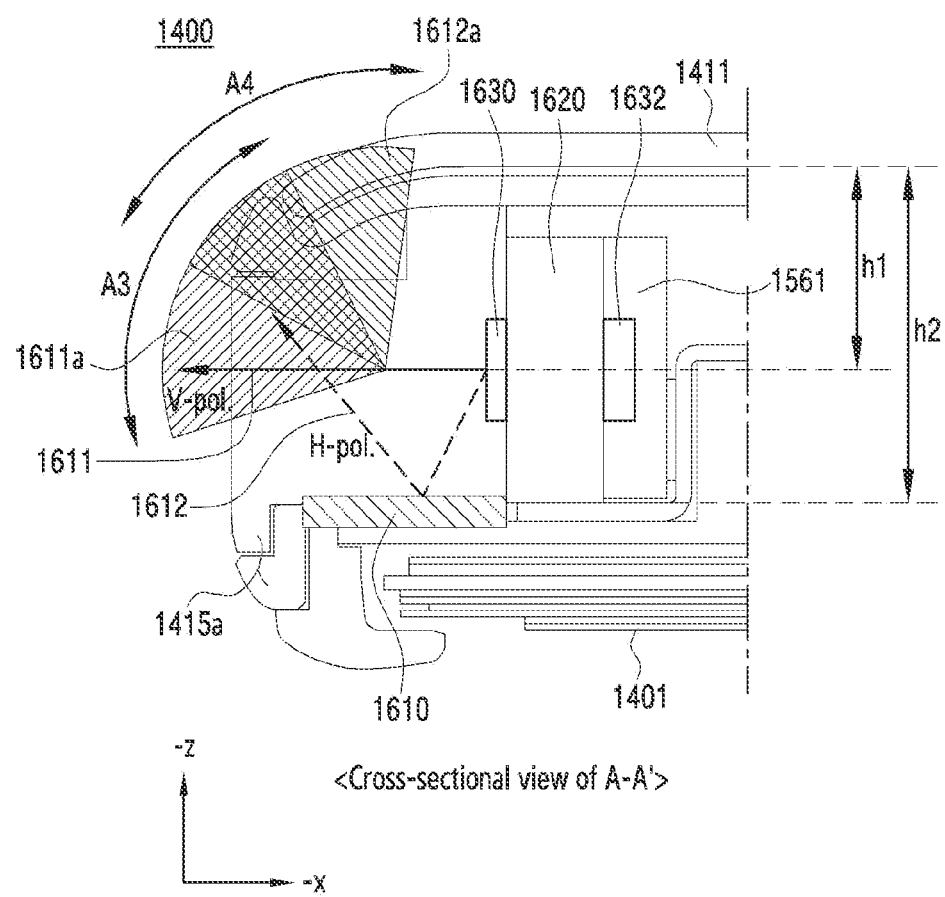
FIG. 16 is a cross-sectional view of the electronic device taken along line A-A' in FIG. 15 according to an embodiment of the disclosure.

FIG. 16 is a cross-sectional view of the electronic device taken along line A-A' in FIG. 15 according to an embodiment of the disclosure.

Referring to FIG. 16, a first antenna module 1561 according to an embodiment may include a printed circuit board 1620, and conductive patches 1630 and/or a wireless communication circuit 1632 disposed on the printed circuit board 1620. The printed circuit board 1620, the conductive patches 1630, and the wireless communication circuit 1632 of the first antenna module 1561 may correspond to the first printed circuit board 320, the conductive patches 310, and the wireless communication circuit 332 of the first antenna module 261 shown in FIG. 3A. In an embodiment, the conductive patches 1630 may be disposed to have a first height h1 (or a first distance) from the rear cover 1411.

In an embodiment, the wireless communication circuit 1632 may transmit and/or receive a signal in a specific frequency band (e.g., about 7.125 GHz or more, or 100 GHz or more) by supply power to the conductive patches 1630.

According to an embodiment, the mobile communication device 1400 may include a conductive plate 1610. In an embodiment, the conductive plate 1610 may be disposed between the first frame 1415a and the first antenna module 1561. The conductive plate 1610 may be formed parallel to the display 1401. In an embodiment, the conductive plate 1610 may be disposed to have a second height h2 (or a second distance) from the rear cover 1411. The second height h2 may be greater than the first height h1.

According to an embodiment, the first antenna module 1561 may transmit and/or receive an RF signal in a specific frequency band (e.g., 20 GHz or more). In an embodiment, a first signal 1611 of the RF signals transmitted and/or received by the first antenna module 1561 may have a vertical polarization characteristic, and a second signal 1612 thereof may have a horizontal polarization characteristic.

According to an embodiment, the first signal 1611 having a vertical polarization characteristic may not be reflected by the conductive plate 1610, compared to the second signal 1612, and the second signal 1612 having a horizontal polarization characteristic may be reflected by the conductive plate 1610 relatively, compared to the first signal 1611. Accordingly, a first transmission/reception beam 1611a based on the first signal 1611 may form a third beam width A3, and a second transmission/reception beam 1612a based on the second signal 1612 may form a fourth beam width A4. As a result, the mobile communication device 1400 may secure a wider antenna coverage based on the first transmission/reception beam 1611a and the second transmission/reception beam 1612a than in the case where the conductive plate 1610 is not disposed.

Although it has been described in FIG. 16 that the conductive plate 1610 is disposed adjacent to the display 1401 to form a transmission/reception beam in the −z direction, the conductive plate 1610, in another embodiment, may be disposed adjacent to the rear cover 1411 to form a transmission/reception beam in the +z direction. For example, the conductive plate 1610 may be disposed to be closer to the rear cover 1411 than the conductive patches 1630. In one example, a third signal having a vertical polarization characteristic among the RF signals transmitted and/or received by the conductive patches 1630 may not be reflected by the conductive plate 1610, compared to a fourth signal having a horizontal polarization characteristic, and the fourth signal having a horizontal polarization characteristic may be reflected by the conductive plate 1610 relatively, compared to the third signal. Accordingly, a third transmission/reception beam based on the third signal may form a first additional beam width in the +x direction, and a fourth transmission/reception beam based on the fourth signal may form a second additional beam width in the +z direction. As a result, the mobile communication device 1400 may secure a wider coverage based on the third transmission/reception beam and the fourth transmission/reception beam than in the case where the conductive plate 1610 is not disposed. In other words, the conductive plate 1610, in another embodiment, may be disposed adjacent to the rear cover 1411 to form a fourth transmission/reception beam in the +z direction, and the mobile communication device 1400 may secure a wide antenna coverage therethrough.

An electronic device 101 according to various embodiments disclosed in this document may include a first housing 211, a second housing 212 rotatably connected to the first housing 211 and including a first surface 231 facing the first housing 211 in a folded state with the first housing 211, a second surface 232 opposite the first surface 231, and a third surface 233 between the first surface 231 and the second surface 232, a first antenna module 261 including a first printed circuit board 320 and conductive patches 310 disposed on one surface of the first printed circuit board 320 facing the third surface 233 of the second housing 212, and disposed adjacent to the third surface 233 of the second housing 212, a conductive plate 410 disposed between the first antenna module 261 and the third surface 233 of the second housing 212, and a wireless communication circuit 332 electrically connected to the first antenna module 261, wherein the conductive patches 310 may be positioned at a first height from the second surface 232 of the second housing 212, wherein the conductive plate 410 may be parallel to the second surface 232 of the second housing 212 and positioned at a second height lower than the first height of the conductive patches 310, and wherein the wireless communication circuit 332 may be configured to supply power to the conductive patches 310 to transmit and/or receive a signal in a frequency band of 20 GHz or more.

According to an embodiment, the signal may include a first signal having a polarization characteristic in a direction perpendicular to one surface of the conductive plate, and the first signal may be reflected by the conductive plate.

According to an embodiment, the signal may include a first signal having a first polarization characteristic in a third direction and a second signal having a second polarization characteristic in a fourth direction.

According to an embodiment, the third direction may be perpendicular to one surface of the conductive plate, and the fourth direction may be perpendicular to the third direction.

According to an embodiment, the PCB may have a first width in a third direction parallel to a first corner formed by the first surface and the third surface of the second housing, and the conductive plate may have a second width, which is greater than the first width, in the third direction.

According to an embodiment, the conductive plate may include a first edge parallel to the first corner formed by the first surface and the third surface of the second housing, and a second edge perpendicular to the first edge, and the length of the second edge may be greater than or equal to a specific value.

According to an embodiment, the conductive plate may be positioned within 0.5 mm from the antenna module.

According to an embodiment, a dielectric may be disposed between the antenna module and the third surface of the second housing.

The electronic device according to an embodiment may further include a conductive structure disposed between the conductive plate and the second surface of the second housing.

According to an embodiment, the conductive plate may have a rectangular shape.

The electronic device according to an embodiment may further include a hinge structure configured to connect the first housing and the second housing such that the first housing and the second housing are rotatable about a first axis.

The electronic device according to an embodiment may further include a support member configured to support the antenna module, and the conductive plate may be in contact with the support member.

According to an embodiment, the conductive patches may include a first conductive patch, a second conductive patch, a third conductive patch, and a fourth conductive patch, and the conductive patches may form a 1×4 antenna array.

The electronic device according to an embodiment may further include a keyboard disposed on the first surface of the second housing.

The electronic device according to an embodiment may further include a display coupled to the first housing, and the display may face the first surface of the second housing when the first housing and the second housing are in the folded state.

An electronic device 101 according to various embodiments disclosed in this document may include a first housing 211, a second housing 212 rotatably connected to the first housing 211 and including a first surface 231 facing the first housing 211 in a folded state with the first housing 211, a second surface 232 opposite the first surface 231, and a third surface 233 between the first surface 231 and the second surface 232, a first antenna module 261 including a first printed circuit board 320 and conductive patches 310 disposed on one surface of the first printed circuit board 320 facing in a second direction forming a specific angle with a first direction perpendicular to the third surface 233 of the second housing 212, and disposed adjacent to the third surface 233 of the second housing 212, a conductive plate 410 at least a portion of which is disposed between the first antenna module 261 and the third surface 233 of the second housing 212, and a wireless communication circuit 332 electrically connected to the first antenna module 261, wherein the first surface 231 and the third surface 233 may form a first corner, wherein the conductive patches may be positioned at a first height from the second surface 232 of the second housing 212, wherein at least a portion of the conductive plate 410 may be parallel to the second surface 232 of the second housing 212 and positioned at a second height lower than the first height of the conductive patches 310, and wherein the wireless communication circuit 332 may be configured to supply power to the conductive patches 310 to transmit and/or receive a signal in a frequency band of 20 GHz or more.

According to an embodiment, the signal may include a first signal having a polarization characteristic in a direction perpendicular to one surface of the conductive plate, and the first signal may be reflected by the conductive plate.

According to an embodiment, the PCB may have a first width in a direction parallel to the first corner, and the conductive plate may have a second width, which is greater than the first width, in a direction parallel to the first corner.

According to an embodiment, the conductive plate may include a first edge parallel to the first corner and a second edge perpendicular to the first edge, and the length of the second edge may be greater than or equal to a specific value.

A mobile communication device 1400 according to various embodiments disclosed in this document may include a display 1401 disposed on a front surface of the mobile communication device 1400, a frame structure 1415 configured to form a first side surface of the mobile communication device 1400, a rear cover 1411 configured to form at least a portion of a rear surface of the mobile communication device 1400, a first antenna module 1561 disposed adjacent to the first side surface of the mobile communication device 1400 and including a printed circuit board 1620 and first conductive patches 1630 disposed on one surface of the printed circuit board 1620 facing the first side surface, a conductive plate 1610 disposed between the first antenna module 1561 and the first side surface of the mobile communication device 1400, and a wireless communication circuit 1632 electrically connected to the first antenna module 1561, wherein the first conductive patches 1630 may be positioned at a first height from the rear cover 1411, wherein the conductive plate 1610 may be parallel to the rear cover 1411 and positioned at a second height higher than the first height of the first conductive patches 1630, and wherein the wireless communication circuit 1632 may be configured to supply power to the first conductive patches 1630 to transmit and/or receive a signal in a frequency band of 20 GHz or more.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
  a housing including:
    a first housing, and;
    a second housing rotatably connected to the first housing and including:
  a first face facing the first housing when the housing is folded,
  a second face opposite the first face, and
  a side face between the first face and the second face, wherein at least portion of the first face and the second face includes a first dielectric;
  an antenna module disposed adjacent to the side face of the second housing, wherein the antenna module comprises:
    a printed circuit board (PCB), and
    conductive patches disposed at the PCB and positioned at a first height from the second face of the second housing;

a conductive plate disposed between the antenna module and the side face of the second housing, and positioned at a second height lower than the first height of the conductive patches;
a second dielectric disposed between the antenna module and the side face, and disposed on the conductive plate; and
a wireless communication circuit configured to supply power to the conductive patches to transmit and/or receive a signal in a frequency band of 20 gigahertz (GHz) or more via the first dielectric and the second dielectric.

2. The electronic device of claim 1,
wherein the signal comprises a first signal having a first polarization in a direction perpendicular to a face of the conductive plate, and
wherein the first signal is reflected by the conductive plate.

3. The electronic device of claim 2, wherein the signal further comprises:
a second signal having a second polarization.

4. The electronic device of claim 3,
wherein the first polarization is perpendicular to the second polarization.

5. The electronic device of claim 1,
wherein the PCB has a first width in a direction parallel to an edge formed by the first face and the side face of the second housing, and
wherein the conductive plate has a second width, which is greater than the first width.

6. The electronic device of claim 1,
wherein the conductive plate comprises:
a first edge parallel to an edge formed by the first face and the side face of the second housing, and
a second edge perpendicular to the first edge, and
wherein a length of the second edge is greater than or equal to a specific value.

7. The electronic device of claim 1, wherein the conductive plate is positioned within 0.5 mm from the antenna module.

8. The electronic device of claim 1, further comprising:
a conductive structure disposed between the conductive plate and the second face of the second housing.

9. The electronic device of claim 1, wherein the conductive plate has a rectangular shape.

10. The electronic device of claim 1, further comprising:
a hinge structure configured to connect the first housing and the second housing such that the first housing and the second housing are rotatable about a first axis.

11. The electronic device of claim 1, further comprising:
a support member configured to support the antenna module,
wherein the conductive plate is in contact with the support member.

12. The electronic device of claim 1,
wherein the conductive patches comprise a first conductive patch, a second conductive patch, a third conductive patch, and a fourth conductive patch, and
wherein the conductive patches form a 1×4 antenna array.

13. The electronic device of claim 1, further comprising:
a keyboard disposed on the first face of the second housing.

14. The electronic device of claim 1, further comprising:
a display coupled to the first housing,
wherein the display faces the first face of the second housing when the housing is folded.

15. An electronic device comprising:
a housing including:
a first housing, and
a second housing rotatably connected to the first housing and including
a first face facing the first housing when the housing is folded,
a second face opposite the surface face, and
a side face between the first face and the second-surface face, wherein the first face and the side face form an edge and wherein at least portion of the first face and the second face includes a first dielectric;
an antenna module disposed adjacent to the side face of the second housing,
wherein the antenna module comprises:
a printed circuit board (PCB), and
conductive patches disposed at the PCB and positioned at a first height from the second face of the second housing;
a conductive plate, wherein at least portion of the conductive plate is disposed between the antenna module and the side face of the second housing, and wherein the conductive plate is positioned at a second height lower than the first height of the conductive patches;
a second dielectric disposed between the antenna module and the side face, and disposed on the conductive plate; and
a wireless communication circuit configured to supply power to the conductive patches to transmit and/or receive a signal in a frequency band of 20 gigahertz (GHz) or more via the first dielectric and the second dielectric.

16. The electronic device of claim 15,
wherein the signal comprises a first signal having a first polarization in a direction perpendicular to a face of the conductive plate, and
wherein the first signal is reflected by the conductive plate.

17. The electronic device of claim 15,
wherein the PCB has a first width in a direction parallel to the edge, and
wherein the conductive plate has a second width, which is greater than the first width.

18. The electronic device of claim 15,
wherein the conductive plate comprises:
a first edge parallel to the edge, and
a second edge perpendicular to the first edge, and
wherein a length of the second edge is greater than or equal to a specific value.

19. A mobile communication device comprising:
a display disposed on a front face of the mobile communication device;
a frame structure forming a side face of the mobile communication device;
a rear cover forming at least portion of a rear face of the mobile communication device, wherein at least portion of the frame structure and the rear cover includes a first dielectric;
an antenna module disposed adjacent to the side face of the mobile communication device, wherein the antenna module comprises:
a printed circuit board (PCB), and
conductive patches disposed of at the PCB to face the side face, the conductive patches being positioned at a first height from the rear cover;
a conductive plate disposed between the antenna module and the side face of the mobile communication device, and positioned at a second height higher than the first height of the conductive patches;
a second dielectric disposed between the antenna module and the side face, and disposed on the conductive plate; and
a wireless communication circuit configured to supply power to the conductive patches transmit and/or receive a signal in a frequency band of 20 gigahertz (GHz) or more via the first dielectric and the second dielectric.

* * * * *